US007870393B2

(12) United States Patent
Moskowitz et al.

(10) Patent No.: US 7,870,393 B2
(45) Date of Patent: *Jan. 11, 2011

(54) STEGANOGRAPHIC METHOD AND DEVICE

(75) Inventors: Scott A. Moskowitz, Sunny Isles Beach, FL (US); Marc Cooperman, Short Hills, NJ (US)

(73) Assignee: Wistaria Trading, Inc., Sunny Isles Beach, FL (US)

( * ) Notice: Subject to any disclaimer, the term of this patent is extended or adjusted under 35 U.S.C. 154(b) by 64 days.

This patent is subject to a terminal disclaimer.

(21) Appl. No.: 11/894,443

(22) Filed: Aug. 21, 2007

(65) Prior Publication Data

US 2008/0075277 A1 Mar. 27, 2008

Related U.S. Application Data

(60) Continuation of application No. 08/999,766, filed on Jul. 23, 1997, which is a division of application No. 08/775,216, filed on Dec. 31, 1996, now Pat. No. 5,687,236, which is a division of application No. 08/489,172, filed on Jun. 7, 1995, now Pat. No. 5,613,004.

(51) Int. Cl.
| | |
|---|---|
| H04L 9/32 | (2006.01) |
| H04L 9/00 | (2006.01) |
| H04L 9/28 | (2006.01) |
| H04N 7/16 | (2006.01) |
| H04N 7/167 | (2006.01) |
| G06F 7/04 | (2006.01) |
| G06F 17/30 | (2006.01) |
| H04K 1/00 | (2006.01) |
| H04M 1/70 | (2006.01) |
| H04M 3/16 | (2006.01) |
| H04R 3/00 | (2006.01) |

(52) U.S. Cl. ............... 713/176; 726/32; 380/28; 380/53; 380/205; 380/207; 380/208

(58) Field of Classification Search .............. 380/28, 380/53, 205, 207, 208; 713/176; 726/32
See application file for complete search history.

(56) References Cited

U.S. PATENT DOCUMENTS

| | | | |
|---|---|---|---|
| 3,947,825 A | 3/1976 | Cassada |
| 3,984,624 A | 10/1976 | Waggener |
| 3,986,624 A | 10/1976 | Cates, Jr. et al. |
| 4,038,596 A | 7/1977 | Lee |
| 4,200,770 A | 4/1980 | Hellman et al. |
| 4,218,582 A | 8/1980 | Hellman et al. |
| 4,339,134 A | 7/1982 | Macheel |
| 4,390,898 A | 6/1983 | Bond et al. |
| 4,405,829 A | 9/1983 | Rivest et al. |
| 4,424,414 A | 1/1984 | Hellman et al. |
| 4,528,588 A | 7/1985 | Lofberg |
| 4,672,605 A | 6/1987 | Hustig et al. |
| 4,748,668 A | 5/1988 | Shamir et al. |
| 4,789,928 A | 12/1988 | Fujisaki |
| 4,827,508 A | 5/1989 | Shear |
| 4,876,617 A | 10/1989 | Best et al. |
| 4,896,275 A | 1/1990 | Jackson |
| 4,908,873 A | 3/1990 | Philibert et al. |
| 4,939,515 A | 7/1990 | Adelson |
| 4,969,204 A | 11/1990 | Melnychuck et al. |
| 4,972,471 A | 11/1990 | Gross et al. |
| 4,977,594 A | 12/1990 | Shear |
| 4,979,210 A | 12/1990 | Nagata et al. |
| 4,980,782 A | 12/1990 | Ginkel |
| 5,050,213 A | 9/1991 | Shear |
| 5,073,925 A | 12/1991 | Nagata et al. |
| 5,077,665 A | 12/1991 | Silverman et al. |
| 5,113,437 A | 5/1992 | Best et al. |
| 5,136,581 A | 8/1992 | Muehrcke |
| 5,136,646 A | 8/1992 | Haber et al. |
| 5,136,647 A | 8/1992 | Haber et al. |
| 5,142,576 A | 8/1992 | Nadan |
| 5,161,210 A | 11/1992 | Druyvesteyn et al. |
| 5,210,820 A | 5/1993 | Kenyon |
| 5,243,423 A | 9/1993 | DeJean et al. |

(Continued)

FOREIGN PATENT DOCUMENTS

EP 0372601 A1 6/1990

(Continued)

OTHER PUBLICATIONS

Staind (The Singles 1996-2006), Warner Music—Atlantic, Pre-Release CD image, 2006, 1 page.
Arctic Monkeys (Whatever People Say I Am, That's What I'm Not), Domino Recording Co. Ltd., Pre-Release CD image, 2005, 1 page.
Radiohead ("Hail To The Thief"), EMI Music Group—Capitol, Pre-Release CD image, 2003, 1 page.
PCT International Search Report, completed Sep. 13, 1995; (PCT/US95/08159) (2 pages).
PCT International Search Report, completed Jun. 11, 1996; (PCT/US96/10257) (4 pages).
Supplementary European Search Report, completed Mar. 5, 2004; (EP 96 91 9405) (1 page).

(Continued)

*Primary Examiner*—Farid Homayounmehr
*Assistant Examiner*—Benjamin A Kaplan
(74) *Attorney, Agent, or Firm*—Neifeld IP Law, PC

(57) ABSTRACT

An apparatus and method for encoding and decoding additional information into a stream of digitized samples in an integral manner. The information is encoded using special keys. The information is contained in the samples, not prepended or appended to the sample stream. The method makes it extremely difficult to find the information in the samples if the proper keys are not possessed by the decoder. The method does not cause a significant degradation to the sample stream. The method is used to establish ownership of copyrighted digital multimedia content and provide a disincentive to piracy of such material.

61 Claims, No Drawings

U.S. PATENT DOCUMENTS

| | | | |
|---|---|---|---|
| 5,243,515 A | 9/1993 | Lee | |
| 5,287,407 A | 2/1994 | Holmes | |
| 5,319,735 A | 6/1994 | Preuss et al. | |
| 5,341,429 A | 8/1994 | Stringer et al. | |
| 5,341,477 A | 8/1994 | Pitkin et al. | |
| 5,363,448 A | 11/1994 | Koopman et al. | |
| 5,365,586 A | 11/1994 | Indeck et al. | |
| 5,369,707 A | 11/1994 | Follendore, III | |
| 5,379,345 A | 1/1995 | Greenberg | |
| 5,394,324 A | 2/1995 | Clearwater | |
| 5,398,285 A | 3/1995 | Borgelt et al. | |
| 5,406,627 A | 4/1995 | Thompson et al. | |
| 5,408,505 A | 4/1995 | Indeck et al. | |
| 5,410,598 A | 4/1995 | Shear | |
| 5,412,718 A | 5/1995 | Narasimhalv et al. | |
| 5,428,606 A | 6/1995 | Moskowitz | |
| 5,450,490 A | 9/1995 | Jensen et al. | |
| 5,469,536 A | 11/1995 | Blank | |
| 5,471,533 A | 11/1995 | Wang et al. | |
| 5,478,990 A | 12/1995 | Montanari et al. | |
| 5,479,210 A | 12/1995 | Cawley et al. | |
| 5,487,168 A | 1/1996 | Geiner et al. | |
| 5,493,677 A | 2/1996 | Balogh et al. | |
| 5,497,419 A | 3/1996 | Hill | |
| 5,506,795 A | 4/1996 | Yamakawa | |
| 5,513,126 A | 4/1996 | Harkins et al. | |
| 5,513,261 A | 4/1996 | Maher | |
| 5,530,739 A | 6/1996 | Okada et al. | |
| 5,530,751 A | 6/1996 | Morris | |
| 5,530,759 A | 6/1996 | Braudaway et al. | |
| 5,548,579 A | 8/1996 | Lebrun et al. | |
| 5,568,570 A | 10/1996 | Rabbani | |
| 5,579,124 A | 11/1996 | Aijala et al. | |
| 5,581,703 A | 12/1996 | Baugher et al. | |
| 5,583,488 A | 12/1996 | Sala et al. | |
| 5,598,470 A | 1/1997 | Cooper et al. | |
| 5,606,609 A | 2/1997 | Houser et al. | |
| 5,613,004 A | 3/1997 | Cooperman et al. | |
| 5,617,119 A | 4/1997 | Briggs et al. | |
| 5,625,690 A | 4/1997 | Michel et al. | |
| 5,629,980 A | 5/1997 | Stefik et al. | |
| 5,633,932 A | 5/1997 | Davis et al. | |
| 5,634,040 A | 5/1997 | Her et al. | |
| 5,636,276 A | 6/1997 | Brugger | |
| 5,636,292 A | 6/1997 | Rhoads | |
| 5,640,569 A | 6/1997 | Miller et al. | |
| 5,646,997 A | 7/1997 | Barton | |
| 5,657,461 A | 8/1997 | Harkins et al. | |
| 5,659,726 A | 8/1997 | Sandford, II et al. | |
| 5,664,018 A | 9/1997 | Leighton | |
| 5,673,316 A | 9/1997 | Auerbach et al. | |
| 5,677,952 A | 10/1997 | Blakley et al. | |
| 5,680,462 A | 10/1997 | Miller et al. | |
| 5,687,236 A | 11/1997 | Moskowitz et al. | |
| 5,689,587 A | 11/1997 | Bender et al. | |
| 5,696,828 A | 12/1997 | Koopman, Jr. | |
| 5,719,937 A | 2/1998 | Warren et al. | |
| 5,721,788 A | 2/1998 | Powell et al. | |
| 5,734,752 A | 3/1998 | Knox | |
| 5,737,416 A | 4/1998 | Cooper et al. | |
| 5,737,733 A | 4/1998 | Eller | |
| 5,740,244 A | 4/1998 | Indeck et al. | |
| 5,745,569 A | 4/1998 | Moskowitz et al. | |
| 5,748,783 A | 5/1998 | Rhoads | |
| 5,751,811 A | 5/1998 | Magnotti et al. | |
| 5,754,697 A | 5/1998 | Fu et al. | |
| 5,757,923 A | 5/1998 | Koopman, Jr. | |
| 5,765,152 A | 6/1998 | Erickson | |
| 5,768,396 A | 6/1998 | Sone | |
| 5,774,452 A | 6/1998 | Wolosewicz | |
| 5,790,677 A | 8/1998 | Fox et al. | |
| 5,799,083 A | 8/1998 | Brothers et al. | |
| 5,809,160 A | 9/1998 | Powell et al. | |
| 5,828,325 A | 10/1998 | Wolosewicz et al. | |
| 5,832,119 A | 11/1998 | Rhoads | |
| 5,850,481 A * | 12/1998 | Rhoads | 382/232 |
| 5,859,920 A | 1/1999 | Daly et al. | |
| 5,860,099 A * | 1/1999 | Milios et al. | 711/103 |
| 5,862,260 A | 1/1999 | Rhoads | |
| 5,884,033 A | 3/1999 | Duvall et al. | |
| 5,889,868 A | 3/1999 | Moskowitz et al. | |
| 5,893,067 A | 4/1999 | Bender et al. | |
| 5,894,521 A | 4/1999 | Conley | |
| 5,903,721 A | 5/1999 | Sixtus | |
| 5,905,800 A | 5/1999 | Moskowitz et al. | |
| 5,905,975 A | 5/1999 | Ausubel | |
| 5,912,972 A | 6/1999 | Barton | |
| 5,917,915 A | 6/1999 | Hirose | |
| 5,918,223 A | 6/1999 | Blum | |
| 5,920,900 A | 7/1999 | Poole et al. | |
| 5,923,763 A | 7/1999 | Walker et al. | |
| 5,930,369 A | 7/1999 | Cox et al. | |
| 5,930,377 A | 7/1999 | Powell et al. | |
| 5,943,422 A | 8/1999 | Van Wie et al. | |
| 5,963,909 A | 10/1999 | Warren et al. | |
| 5,973,731 A | 10/1999 | Schwab | |
| 5,974,141 A | 10/1999 | Saito | |
| 5,999,217 A | 12/1999 | Berners-Lee | |
| 6,029,126 A | 2/2000 | Malvar | |
| 6,041,316 A | 3/2000 | Allen | |
| 6,044,471 A | 3/2000 | Colvin | |
| 6,049,838 A | 4/2000 | Miller et al. | |
| 6,051,029 A | 4/2000 | Paterson et al. | |
| 6,067,622 A | 5/2000 | Moore | |
| 6,081,251 A | 6/2000 | Sakai et al. | |
| 6,088,455 A | 7/2000 | Logan et al. | |
| 6,131,162 A | 10/2000 | Yoshiura et al. | |
| 6,141,753 A | 10/2000 | Zhao et al. | |
| 6,141,754 A | 10/2000 | Choy | |
| 6,192,138 B1 | 2/2001 | Yamadaji | |
| 6,199,058 B1 | 3/2001 | Wong et al. | |
| 6,205,249 B1 | 3/2001 | Moskowitz | |
| 6,208,745 B1 | 3/2001 | Florenio et al. | |
| 6,230,268 B1 | 5/2001 | Miwa et al. | |
| 6,233,347 B1 | 5/2001 | Chen et al. | |
| 6,233,684 B1 | 5/2001 | Stefik et al. | |
| 6,240,121 B1 | 5/2001 | Senoh | |
| 6,263,313 B1 | 7/2001 | Milstead et al. | |
| 6,272,634 B1 | 8/2001 | Tewfik et al. | |
| 6,275,988 B1 | 8/2001 | Nagashima et al. | |
| 6,278,780 B1 | 8/2001 | Shimada | |
| 6,278,791 B1 | 8/2001 | Honsinger et al. | |
| 6,282,300 B1 | 8/2001 | Bloom et al. | |
| 6,282,650 B1 | 8/2001 | Davis | |
| 6,285,775 B1 | 9/2001 | Wu et al. | |
| 6,301,663 B1 | 10/2001 | Kato et al. | |
| 6,330,335 B1 | 12/2001 | Rhoads | |
| 6,330,672 B1 | 12/2001 | Shur | |
| 6,345,100 B1 | 2/2002 | Levine | |
| 6,351,765 B1 | 2/2002 | Pietropaolo et al. | |
| 6,363,483 B1 * | 3/2002 | Keshav | 713/176 |
| 6,373,960 B1 | 4/2002 | Conover et al. | |
| 6,374,036 B1 | 4/2002 | Ryan et al. | |
| 6,377,625 B1 | 4/2002 | Kim | |
| 6,381,618 B1 | 4/2002 | Jones et al. | |
| 6,381,747 B1 | 4/2002 | Wonfor et al. | |
| 6,385,329 B1 | 5/2002 | Sharma et al. | |
| 6,389,538 B1 | 5/2002 | Gruse et al. | |
| 6,405,203 B1 | 6/2002 | Collart | |
| 6,415,041 B1 | 7/2002 | Oami et al. | |
| 6,425,081 B1 | 7/2002 | Iwamura | |
| 6,430,301 B1 | 8/2002 | Petrovic | |
| 6,430,302 B2 | 8/2002 | Rhoads | |
| 6,442,283 B1 | 8/2002 | Tewfik et al. | |

| | | |
|---|---|---|
| 6,446,211 B1 | 9/2002 | Colvin |
| 6,453,252 B1 | 9/2002 | Laroche |
| 6,457,058 B1 | 9/2002 | Ullum et al. |
| 6,463,468 B1 | 10/2002 | Buch et al. |
| 6,484,264 B1 | 11/2002 | Colvin |
| 6,493,457 B1 | 12/2002 | Quackenbush et al. |
| 6,502,195 B1 | 12/2002 | Colvin |
| 6,522,769 B1 | 2/2003 | Rhoads et al. |
| 6,523,113 B1 | 2/2003 | Wehrenberg |
| 6,530,021 B1 | 3/2003 | Epstein et al. |
| 6,532,284 B2 | 3/2003 | Walker et al. |
| 6,557,103 B1 | 4/2003 | Boncelet, Jr. et al. |
| 6,584,125 B1 | 6/2003 | Katto |
| 6,587,837 B1 | 7/2003 | Spagna et al. |
| 6,598,162 B1 | 7/2003 | Moskowitz |
| 6,606,393 B1 | 8/2003 | Xie et al. |
| 6,647,424 B1 | 11/2003 | Pearson et al. |
| 6,658,010 B1 | 12/2003 | Enns et al. |
| 6,665,489 B2 | 12/2003 | Collart |
| 6,668,246 B1 | 12/2003 | Yeung et al. |
| 6,668,325 B1 | 12/2003 | Collberg et al. |
| 6,674,858 B1 | 1/2004 | Kimura et al. |
| 6,725,372 B1 | 4/2004 | Lewis et al. |
| 6,754,822 B1 | 6/2004 | Zhao |
| 6,775,772 B1 | 8/2004 | Binding et al. |
| 6,784,354 B1 | 8/2004 | Lu et al. |
| 6,785,815 B1 | 8/2004 | Serret-Avila et al. |
| 6,785,825 B2 | 8/2004 | Colvin |
| 6,792,548 B2 | 9/2004 | Colvin |
| 6,792,549 B2 | 9/2004 | Colvin |
| 6,795,925 B2 | 9/2004 | Colvin |
| 6,799,277 B2 | 9/2004 | Colvin |
| 6,813,717 B2 | 11/2004 | Colvin |
| 6,813,718 B2 | 11/2004 | Colvin |
| 6,823,455 B1 | 11/2004 | Macy et al. |
| 6,834,308 B1 | 12/2004 | Ikezoye et al. |
| 6,842,862 B2 | 1/2005 | Chow et al. |
| 6,857,078 B2 | 2/2005 | Colvin |
| 6,931,534 B1 | 8/2005 | Jandel et al. |
| 6,966,002 B1 | 11/2005 | Torrubia-Saez |
| 6,968,337 B2 | 11/2005 | Wold |
| 6,977,894 B1 | 12/2005 | Achilles et al. |
| 6,978,370 B1 | 12/2005 | Kocher |
| 6,986,063 B2 | 1/2006 | Colvin |
| 7,020,285 B1 | 3/2006 | Kirovski et al. |
| 7,043,050 B2 | 5/2006 | Yuval |
| 7,046,808 B1 | 5/2006 | Metois et al. |
| 7,050,396 B1 | 5/2006 | Cohen et al. |
| 7,051,208 B2 | 5/2006 | Venkatesan et al. |
| 7,058,570 B1 | 6/2006 | Yu et al. |
| 7,093,295 B1 | 8/2006 | Saito |
| 7,103,184 B2 | 9/2006 | Jian |
| 7,107,451 B2 | 9/2006 | Moskowitz |
| 7,150,003 B2 | 12/2006 | Naumovich et al. |
| 7,162,642 B2 | 1/2007 | Schumann et al. |
| 7,177,430 B2 | 2/2007 | Kim |
| 7,206,649 B2 | 4/2007 | Kirovski et al. |
| 7,231,524 B2 | 6/2007 | Burns |
| 7,233,669 B2 | 6/2007 | Candelore |
| 7,240,210 B2 | 7/2007 | Michak et al. |
| 7,266,697 B2 | 9/2007 | Kirovski et al. |
| 7,286,451 B2 | 10/2007 | Wirtz et al. |
| 7,289,643 B2 | 10/2007 | Brunk et al. |
| 7,363,278 B2 | 4/2008 | Schmelzer et al. |
| 7,460,994 B2 | 12/2008 | Herre et al. |
| 7,568,100 B1 | 7/2009 | Moskowitz et al. |
| 7,743,001 B1 | 6/2010 | Vermeulen et al. |
| 2001/0043594 A1 | 11/2001 | Ogawa et al. |
| 2002/0026343 A1 | 2/2002 | Duenke |
| 2002/0073043 A1 | 6/2002 | Herman et al. |
| 2002/0097873 A1 | 7/2002 | Petrovic |
| 2002/0103883 A1 | 8/2002 | Haverstock et al. |
| 2002/0161741 A1 | 10/2002 | Wang et al. |
| 2003/0126445 A1 | 7/2003 | Wehrenberg |
| 2003/0133702 A1 | 7/2003 | Collart |
| 2004/0028222 A1 | 2/2004 | Sewell et al. |
| 2004/0037449 A1 | 2/2004 | Davis et al. |
| 2004/0049695 A1 | 3/2004 | Choi et al. |
| 2004/0059918 A1 | 3/2004 | Xu |
| 2004/0083369 A1 | 4/2004 | Erlingsson et al. |
| 2004/0093521 A1 | 5/2004 | Hamadeh et al. |
| 2004/0117628 A1 | 6/2004 | Colvin |
| 2004/0117664 A1 | 6/2004 | Colvin |
| 2004/0125983 A1 | 7/2004 | Reed et al. |
| 2004/0128514 A1 | 7/2004 | Rhoads |
| 2004/0225894 A1 | 11/2004 | Colvin |
| 2005/0160271 A9 | 7/2005 | Brundage et al. |
| 2005/0246554 A1 | 11/2005 | Batson |
| 2006/0005029 A1 | 1/2006 | Petrovic et al. |
| 2006/0013395 A1 | 1/2006 | Brundage et al. |
| 2006/0013451 A1 | 1/2006 | Haitsma |
| 2006/0041753 A1 | 2/2006 | Haitsma |
| 2007/0083467 A1 | 4/2007 | Lindahl et al. |
| 2007/0127717 A1 | 6/2007 | Herre et al. |
| 2007/0253594 A1 | 11/2007 | Lu et al. |

FOREIGN PATENT DOCUMENTS

| | | |
|---|---|---|
| EP | 0565947 A1 | 10/1993 |
| EP | 0581317 A2 | 2/1994 |
| EP | 0649261 | 4/1995 |
| EP | 0651554 A | 5/1995 |
| EP | 1354276 B1 | 12/2007 |
| NL | 100523 | 9/1998 |
| WO | WO 95/14289 | 5/1995 |
| WO | WO 96/29795 | 9/1996 |
| WO | WO 97/24833 | 7/1997 |
| WO | WO 9744736 | 11/1997 |
| WO | WO98/37513 | 8/1998 |
| WO | WO 9952271 | 10/1999 |
| WO | WO 99/62044 | 12/1999 |
| WO | WO 9963443 | 12/1999 |

OTHER PUBLICATIONS

PCT International Search Report, completed Apr. 4, 1997; (PCT/US97/00651) (1 page).

PCT International Search Report, completed May 6, 1997; (PCT/US97/00652) (3 pages).

PCT International Search Report, completed Oct. 23, 1997; (PCT/US97/11455) (1 page).

PCT International Search Report, completed Jul. 12, 1999; (PCT/US99/07262) (3 pages).

PCT International Search Report, completed Jun. 30, 2000; (PCT/US00/06522) (7 pages).

Supplementary European Search Report, completed Jun. 27, 2002; (EP 00 91 9398) (1 page).

PCT International Search Report, date of mailing Mar. 15, 2001; (PCT/US00/18411) (5 pages).

PCT International Search Report, completed Jul. 20, 2001; (PCT/US00/18411) (5 pages).

PCT International Search Report, completed Mar. 20, 2001; (PCT/US00/33126) (6 pages).

PCT International Search Report, completed Jan. 26, 2001; (PCT/US00/21189) (3 pages).

Schneier, Bruce, Applied Cryptography, 2nd Ed., John Wiley & Sons, pp. 9-10, 1996.

Menezes, Alfred J., Handbook of Applied Crypography, CRC Press, p. 46, 1997.

Merriam-Webster's Collegiate Dictionary, 10th Ed., Merriam Webster, Inc., p. 207.

Brealy, et al., Principles of Corporate Finance, "Appendix A—Using Option Valuation Models", 1984, pp. 448-449.

Copeland, et al., Real Options:A Practitioner's Guide, 2001 pp. 106-107, 201-202, 204-208.

Sarkar, M. "An Assessment of Pricing Mechanisms for the Internet—A Regulatory Imperative", presented MIT Workshop on Internet Economics, Mar. 1995; http://www.press.vmich.edu/jep/works/SarkAsses.html on Mar. 12, 2001.

Crawford, D.W. "Pricing Network Usage: A Market for Bandwith of Market Communication?" presented MIT Workshop on Internet Economics, Mar. 1995 http://www.press.vmich.edu/jep/works/CrawMarket.html on Mar. 12, 2001.

Low, S.H., "Equilibrium Allocation and Pricing of Variable Resources Among User-Suppliers", 1988. http://www.citesear.nj.nec.com/366503.html.

Caronni, Germano, "Assuring Ownership Rights for Digital Images", published proceeds of reliable IT systems, v15 '95, H.H. Bruggemann and W Gerhardt-Hackel (Ed.), Viewing Publishing Company, Germany 1995.

Zhao, Jian. "A WWW Service to Embed and Prove Digital Copyright Watermarks", Proc. of the european conf. on Mulitmedia Applications, Services & Techniques, Louvain-La-Nevve, Belgium, May 1996.

Gruhl, Daniel et al., Echo Hiding. In Proceeding of the Workshop on Information Hiding. No. 1174 in Lecture Notes in Computer Science, Cambridge, England (May/Jun. 1996).

Oomen, A.W.J. et al., A Variable Bit Rate Buried Data Channel for Compact Disc, J.Audio Eng.Sc.,vol. 43,No. 1/2,pp. 23-28 (1995).

Ten Kate,W. et al., A New Surround-Stereo-Surround Coding Techniques, J. Audio Eng.Soc.,vol. 40,No. 5,pp. 376-383 (1992).

Gerzon, Michael et al., A High Rate Buried Data Channel for Audio CD, presentation notes, Audio Engineering Soc. 94th Convention (1993).

Sklar, Bernard, Digital Communications, pp. 601-603 (1988).

Jayant, N.S. et al., Digital Coding of Waveforms, Prentice Hall Inc., Englewood Cliffs,NJ, pp. 486-509 (1984).

Bender, Walter R. et al., Techniques for Data Hiding, SPIE Int. Soc. Opt. Eng., vol. 2420, pp. 164-173, 1995.

Zhao, Jian et al., Embedding Robust Labels into Images for Copyright Protection, (xp 000571976), pp. 242-251, 1995.

Menezes, Alfred J., Handbook of Applied Cryptography, CRC Press, p. 175, 1997.

Schneier, Bruce, Applied Cryptography, 1st Ed., pp. 67-68, 1994.

ten Kate, W. et al., "Digital Audio Carrying Extra Information", IEEE, CH 2847-2/90/0000-1097, (1990).

van Schyndel, et al. A digital Watermark, IEEE Int'l Computer Processing Conference, Austin,TX, Nov. 13-16, 1994, pp. 86-90.

Smith, et al. Modulation and Information Hiding in Images, Springer Verlag, 1st Int'l Workshop, Cambridge, UK, May 30-Jun. 1, 1996, pp. 207-227.

Kutter, Martin et al., Digital Signature of Color Images Using Amplitude Modulation, SPIE-E197, vol. 3022, pp. 518-527.

Puate, Joan et al., Using Fractal Compression Scheme to Embed a Digital Signature into an Image, SPIE-96 Proceedings, vol. 2915, Mar. 1997, pp. 108-118.

Swanson, Mitchell D.,et al., Transparent Robust Image Watermarking, Proc. of the 1996 IEEE Int'l Conf. on Image Processing, vol. 111, 1996, pp. 211-214.

Swanson, Mitchell D., et al. Robust Data Hiding for Images, 7th IEEE Digital Signal Processing Workshop, Leon, Norway. Sep. 1-4, 1996, pp. 37-40.

Zhao, Jian et al., Embedding Robust Labels into Images for Copyright Protection, Proceeding of the Know Right '95 Conference, pp. 242-251.

Koch, E., et al., Towards Robust and Hidden Image Copyright Labeling, 1995 IEEE Workshop on Nonlinear Signal and Image Processing, Jun. 1995. Neos Marmaras, pp. 4.

Van Schyandel, et al. Towards a Robust Digital Watermark, Second Asain Image Processing Conference, Dec. 6-8,1995, Singapore, vol. 2,pp. 504-508.

Tirkel,A.Z., A Two-Dimensional Digital Watermark, DICTA '95, Univ. of Queensland, Brisbane, Dec. 5-8, 1995, pp. 7.

Tirkel,A.Z., Image Watermarking—A Spread Spectrum Application, ISSSTA '96, Sep. 96, Mainz, German, pp. 6.

O'Ruanaidh, et al. Watermarking Digital Images for Copyright Protection, IEEE Proceedings, vol. 143, No. 4, Aug. 96, pp. 250-256.

Cox, et al., Secure Spread Spectrum Watermarking for Multimedia, NEC Research Institute, Techinal Report 95-10, pp. 33.

Kahn, D., The Code Breakers, The MacMillan Company, 1969, pp. xIII, 81-83,513,515,522-526,863.

Boney, et al., Digital Watermarks for Audio Signals, EVSIPCO, 96, pp. 473-480.

Dept. of Electrical Engineering, Del Ft University of Technology, Del ft The Netherlands,Cr.C. Langelaar et al.,Copy Protection for Mulitmedia Data based on Labeling Techniques, Jul. 1996, 9 pp.

F. Hartung, et al., Digital Watermarking of Raw and Compressed Video, SPIE vol. 2952, pp. 205-213.

Craver, et al., Can Invisible Watermarks Resolve Rightful Ownerships? IBM Research Report, RC 20509 (Jul. 25, 1996) 21 pp.

Press, et al., Numerical Recipes In C, Cambridge Univ. Press, 1988, pp. 398-417.

Pohlmann, Ken C., Principles of Digital Audio, 3rd Ed., 1995, pp. 32-37, 40-48,138,147-149,332,333,364, 499-501,508-509,564-571.

Pohlmann, Ken C., Principles of Digital Audio, 2nd Ed., 1991, pp. 1-9,19-25,30-33,41-48,54-57,86-107,375-387.

Schneier, Bruce, Applied Cryptography, John Wiley & Sons, inc. , New York,1994, pp. 68,69,387-392,1-57,273-275,321-324.

Boney, et al., Digital Watermarks for Audio Signals, Proceedings of the International Conf. on Multimedia Computing and Systems, Jun. 17-23.1996.Hiroshima, Japan, 0-8186-7436-9196, pp. 473-480.

Johnson, et al., Transform Permuted Watermarking for Copyright Protection of Digital Video, IEEE Globecom 1998, Nov. 8-12,1998, New York, New York, vol. 2, 1998, pp. 684-689 (ISBN 0-7803-4985-7).

Rivest, et al., "Pay Word and Micromint: Two Simple Micropayment Schemes," MIT Laboratory for Computer Science, Cambridge, MA, May 7, 1996, pp. 1-18.

Bender, et al., Techniques for Data Hiding, IBM Systems Journal, vol. 35, Nos. 3 & 4,1996,pp. 313-336.

Moskowitz, Bandwith as Currency, IEEE Multimedia, Jan.-Mar. 2003, pp. 14-21.

Moskowitz, Multimedia Security Technologies for Digital Rights Management, 2006, Academic Press, "Introduction—Digital Rights Management", pp. 3-22.

Tomsich, et al., "Towards a secure and de-centralized digital watermarking infrastructure for the protection of Intellectual Property", in Electronic Commerce and Web Technologies, Proceedings (ECWEB 2000), Springer LNCS, vol. 1875, 2000, pp. 38-47.

Moskowitz, "What is Acceptable Quality in the Application of Digital Watermarking: Trade-offs of Security, Robustness and Quality", IEEE Computer Society, Proceedings of ITCC 2002, Apr. 10, 2002, pp. 80-84.

Lemma, et al. "Secure Watermark Embedding through Partial Encryption", International Workshop on Digital Watermarking ("IWDW" 2006), Springer Lecture Notes in Computer Science,2006, (to appear), 13 pages.

Kocher, et al., "Self Protecting Digital Content", Technical Report from the CRI Content Security Research Initiative, Crytography Research, Inc. 2002-2003. 14 pages.

Sirbu, M. et al., "Net Bill: An Internet Commerce System Optimized for Network Delivered Services" Digest of Papers of the Computer Society Computer Conference (Spring), Mar. 5, 1995, on 20-25, vol. CONF40.

Schunter, M. et al., "A Status Report on the SEMPER framework for Secure Electronic Commerce", Computer Networks and ISDN Systems, Sep. 30, 1998, pp. 1501-1510, vol. 30, No. 16-18, NL, North Holland.

Konrad, K. et al., "Trust and Elecronic Commerce—more than a techinal problem," Proceedings of the 18th IEEE Symposium on Reliable Distributed Systems, Oct. 19-22, 1999, pp. 360-365, Lausanne.

Kini, A. et al., "Trust in Electronic Commerce: Definition and Theoretical Considerations", Proceedings of the Thirty-first Hawaii International Conf on System Sciences (Cat. No. 98TB100216), Jan. 6-9, 1998, pp. 51-61, Los Alamitos, CA, USA, 1060-3425/98 $10.00 (C) 1998 IEEE.

Steinauer D. D., et al., "Trust and Traceability in Electronic Commerce", Standard View, Sep. 1997, pp. 118-124, vol. 5 No. 3, ACM, USA.

Hartung, et al. "Multimedia Watermarking Techniques", Proceedings of the IEEE, Special Issue, Identification & Protection of Multimedia Information, No. 1079-1107, Jul. 1999, vol. 87, No. 7, IEEE.

Rivest,et al., PayWord and MicroMint: Two simple micropayment schemes, MIT Laboratory for Computer Science, Cambridge, MA 02139, Apr. 27, 2001, pp. 1-18.

Horowitz, et al., The Art of Electronics, 2nd Ed., 1989, pp. 7.

Delaigle, J.-F., et al. "Digital Watermarking," Proceedings of the SPIE, vol. 2659, Feb. 1, 1996, pp. 99-110 (Abstract).

Schneider, M., et al. "Robust Content Based Digital Signature for Image Authentication," Proceedings of the International Conference on Image Processing (IC. Lausanne). Sept. 16-19, 1996, pp. 227-230, IEEE ISBN.

Cox, I. J., et al. "Secure Spread Spectrum Watermarking for Multimedia," IEEE Transactions on Image Processing, vol. 6 No. 12, Dec. 1, 1997, pp. 1673-1686.

Wong, Ping Wah. "A Public Key Watermark for Image Verification and Authentication," IEEE International Conference on Image Processing, vol. 1, Oct. 4-7, 1998, pp. 455-459.

Fabien A.P. Petitcolas, Ross J. Anderson and Markkus G. Kuhn, "Attacks on Copyright Marking Systems," LNCS, vol. 1525, Apr. 14-17, 1998, pp. 218-238, ISBN: 3-540-65386-4.

Ross Anderson, "Stretching the Limits of Steganography," LNCS, vol. 1174, May/Jun. 1996, 10 pages, ISBN: 3-540-61996-8.

Joseph J.K. O'Ruanaidh and Thierry Pun, "Rotation, Scale and Translation Invariant Digital Image Watermarking", pre-publication, Summer 1997, 4 pages.

Joseph J.K. O'Ruanaidh and Thierry Pun, "Rotation, Scale and Translation Invariant Digital Image Watermarking", Submitted to Signal Processing Aug. 21, 1997, 19 pages.

European Search Report & European Search Opinion, completed Oct. 15, 2007; (EP 07 11 2420) (9 pages).

OASIS (Dig Out Your Soul), Big Brother Recordings Ltd, Promotional CD image, 2008, 1 page.

Rivest, R. "Chaffing and Winnowing: Confidentiality without Encryption", MIT Lab for Computer Science, http://people.csail.mit.edu/rivest/Chaffing.txt, Apr. 24, 1998, 9 pp.

PortalPlayer, PP5002 digitalmedia management system-on-chip, May 1, 2003, 4 pp.

VeriDisc, "The Search for a Rational Solution to Digital Rights Management (DRM)", http://64.244.235.240/news/whitepaper", /docs/veridisc_white_paper.pdf, 2001, 15 pp.

Cayre, et al., "Kerckhoff's-Based Embedding Security Classes for WOA Data Hiding", IEEE Transactions on Information Forensics and Security, vol. 3 No. 1, Mar. 2008, 15 pp.

Wayback Machine, dated Jan. 17, 1999, http://web.archive.org/web/19990117020420/http://www.netzero.com/, accessed on Feb. 19, 2008.

Namgoong, H., "An Integrated Approach to Legacy Data for Multimedia Applications", Proceedings of the 23rd EUROMICRO Conference, vol. Issue 1-4, Sep. 1997, pp. 387-391.

Wayback Machine, dated Aug. 26, 2007, http://web.archive.org/web/20070826151732/http://www.screenplaysmag.com/tabid/96/articleType/ArticleView/articleId/495/Default.aspx/.

"You Tube Copyright Policy: Video Identification tool—You Tube Help", accessed Jun. 4, 2009, http://www.google.com/support/youtube/bin/answer.py?hl=en&answer=83766, 3 pp.

Morimoto, "Techniques for Data Hiding in Audio Files", pp. through 12, no publication date provided, Massachusetts, United States.

Morimoto, "Techniques for Data Riding in Audio Files", 76 pages, no publication date provided, Massachusetts, United States.

U.S. Appl. No. 08/999,766, filed Jul. 23, 1997, entitled "Steganographic Method and Device" (issued as U.S. Patent No. 7,568,100).

U.S. Appl. No. 11/894,443, filed Aug. 21, 2007, entitled "Steganographic Method and Device"—Publication No. 20080075277—Mar. 27, 2008.

U.S. Appl. No. 11/894,476, filed Aug. 21, 2007, entitled "Steganographic Method and Device"—Publication No. 20070294536—Dec. 20, 2007.

U.S. Appl. No. 11/050,779, filed Feb. 7, 2005, entitled "Steganographic Method and Device"—Publication No. 20050177727—Aug. 11, 2005 (issued as U.S. Patent No. 7,761,712).

U.S. Appl. No. 12/383,916, filed Mar. 30, 2009, entitled "Steganographic Method and Device"—Publication No. 20090220074—Sep. 3, 2009.

U.S. Appl. No. 12/802,519, filed Jun. 8, 2010, entitled "Steganographic Method and Device".

U.S. Appl. No. 08/674,726, filed Jul. 2, 1996, entitled "Exchange Mechanisms for Digital Information Packages with Bandwidth Securization, Multichannel Digital Watermarks, and Key Management" (issued as U.S. Patent No. 7,362,775).

U.S. Appl. No. 12/009,914, filed Jan. 23, 2008, entitled "Exchange Mechanisms for Digital Information Packages with Bandwidth Securitization, Multichannel Digital Watermarks, and Key Management"—Publication No. 20080151934—Jun. 26, 2008 (Notice of Allowance rec'd).

U.S. Appl. No. 09/545,589, filed Apr. 7, 2000, entitled "Method and System for Digital Watermarking" (issued as U.S. Patent No. 7,007,166).

U.S. Appl. No. 11/244,213, filed Oct. 5, 2005, entitled "Method and System for Digital Watermarking"—Publication No. 20060101269—May 11, 2006 (issued as U.S. Patent No. 7,343,492).

U.S. Appl. No. 11/649,026, filed Jan. 3, 2007, entitled "Method and System for Digital Watermarking"—Publication No. 20070113094—May 17, 2007 (to issue as U.S. Patent No. 7,779,261 on Aug. 17, 2010).

U.S. Appl. No. 12/803,194, filed Jun. 21, 2010, entitled "Method and System for Digital Watermarking".

U.S. Appl. No. 12/005,230, filed Dec. 26, 2007, entitled "Method and System for Digital Watermarking"—Publication No. 20080133927—Jun. 5, 2008 (issued as U.S. Patent No. 7,770,017).

U.S. Appl. No. 12/803,168, filed Jun. 21, 2010, entitled "Method and System for Digital Watermarking".

U.S. Appl. No. 09/046,627, filed Mar. 24, 1998, entitled "Method for Combining Transfer Function with Predetermined Key Creation" (issued as U.S. Patent No. 6,598,162).

U.S. Appl. No. 10/602,777, filed Jun. 25, 2003, entitled "Method for Combining Transfer Function with Predetermined Key Creation"—Publication No. 20040086119—May 6, 2004 (issued as U.S. Patent No. 7,664,263).

U.S. Appl. No. 12/655,002, filed Dec. 22, 2009, entitled "Method for Combining Transfer Function with Predetermined Key Creation"—Publication No. 20100098251—Apr. 22, 2010.

U.S. Appl. No. 11/895,388, filed Aug. 24, 2007, entitled "Data Protection Method and Device"—Publication No. 20080016365—Jan. 17, 2008.

U.S. Appl. No. 09/053,628, filed Apr. 2, 1998, entitled "Multiple Transform Utilization and Application for Secure Digital Watermarking" (issued as U.S. Patent No. 6,205,249).

U.S. Appl. No. 09/644,098, filed Aug. 23, 2000, entitled "Mutiple Transform Utilization and Application for Secure Digital Watermarking" (issued as U.S. Patent No. 7,035,409).

U.S. Appl. No. 09/767,733, filed Jan. 24, 2001, entitled "Multiple Transform Utilization and Application for Secure Digital Watermarking"—Publication No. 20010010078—Jul. 26, 2001.

U.S. Appl. No. 11/358,874, filed Feb. 21, 2006, entitled "Multiple Transform Utilization and Application for Secure Digital Watermarking"—Publication No. 20060140403—Jun. 29, 2006 (issued as U.S. Patent No. 7,738,659).

U.S. Appl. No. 12/799,894, filed May 4, 2010, entitled "Multiple Transform Utilization and Application for Secure Digital Watermarking".

U.S. Appl. No. 10/417,231, filed Apr. 17, 2003, entitled "Methods, Systems And Devices For Packet Watermarking And Efficient Provisioning Of Bandwidth"—Publication No. 20030200439—Oct. 23, 2003 (issued as U.S. Patent No. 7,287,275).

U.S. Appl. No. 11/900,065, filed Sep. 10, 2007, entitled "Methods, Systems And Devices For Packet Watermarking And Efficient Provisioning Of Bandwidth"—Publication No. 20080005571—Jan. 3, 2008.

U.S. Appl. No. 11/900,066, filed Sep. 10, 2007, entitled "Methods, Systems And Devices For Packet Watermarking And Efficient Provisioning Of Bandwidth"—Publication No. 20080005572—Jan. 3, 2008 (issued as U.S. Patent No. 7,530,102).

U.S. Appl. No. 12/383,289, filed Mar. 23, 2009, entitled "Methods, Systems And Devices For Packet Watermarking And Efficient Provisioning Of Bandwidth"—Publication No. 20090210711—Aug. 20, 2009.

U.S. Appl. No. 09/789,711, filed Feb. 22, 2001, entitled "Optimization Methods for the Insertion, Protection, and Detection of Digital Watermarks in Digital Data"—Publication No. 20010010078—Oct. 11, 2001 (issued as U.S. Patent No. 7,107,451).

U.S. Appl. No. 11/497,822, filed Aug. 2, 2006, entitled "Optimization Methods for the Insertion, Protection, and Detection of Digital Watermarks in Digital Data"—Publication No. 20070011458—Jan. 11, 2007 (issued as U.S. Patent No. 7,457,962).

U.S. Appl. No. 12/217,834, filed Jul. 9, 2008, entitled "Optimization Methods for the Insertion, Protection, and Detection of Digital Watermarks in Digital Data"—Publication No. 20090037740—Feb. 5, 2009.

U.S. Appl. No. 11/599,964, filed Nov. 15, 2006, entitled "Optimization Methods for the Insertion, Protection, and Detection of Digital Watermarks in Digital Data"—Publication No. 20080046742—Feb. 21, 2008 (issued as U.S. Patent No. 7,647,502).

U.S. Appl. No. 12/592,331, filed Nov. 23, 2009, entitled "Optimization Methods for the Insertion, Protection, and Detection of Digital Watermarks in Digital Data"—Publication No. 20100077220—Mar. 25, 2010.

U.S. Appl. No. 11/599,838, filed Nov. 15, 2006, entitled "Optimization Methods for the Insertion, Protection, and Detection of Digital Watermarks in Digital Data"—Publication No. 20070226506—Sep. 27, 2007 (Notice of Allowance rec'd).

U.S. Appl. No. 12/590,553, filed Nov. 10, 2009, entitled "Optimization Methods for the Insertion, Protection, and Detection of Digital Watermarks in Digital Data"—Publication No. 20100077219—Mar. 25, 2010.

U.S. Appl. No. 11/897,790, filed Aug. 31, 2007, entitled "Optimization Methods for the Insertion, Protection, and Detection of Digital Watermarks in Digital Data"—Publication No. 20070300072—Dec. 27, 2007 (issued as U.S. Patent 7,664,958).

U.S. Appl. No. 12/462,799, filed Aug. 10, 2009, entitled "Optimization Methods for the Insertion, Protection, and Detection of Digital Watermarks in Digital Data"—Publication No. 20100005308—Jan. 7, 2010.

U.S. Appl. No. 11/897,791, filed Aug. 31, 2007, entitled "Optimization Methods for the Insertion, Protection, and Detection of Digital Watermarks in Digital Data"—Publication No. 20080022113—Jan. 24, 2008.

U.S. Appl. No. 11/899,661, filed Sep. 7, 2007, entitled "Optimization Methods for the Insertion, Protection, and Detection of Digital Watermarks in Digital Data"—Publication No. 20070300073—Dec. 27, 2007 (issued as U.S. Patent 7,647,503).

U.S. Appl. No. 12/590,681, filed Nov. 12, 2009, entitled "Optimization Methods for the Insertion, Protection, and Detection of Digital Watermarks in Digital Data"—Publication No. 20100064140—Mar. 11, 2010.

U.S. Appl. No. 11/899,662, filed Sep. 7, 2007, entitled "Optimization Methods for the Insertion, Protection, and Detection of Digital Watermarks in Digital Data"—Publication No. 20080022114—Jan. 24, 2008.

U.S. Appl. No. 10/369,344, filed Feb. 18, 2003, entitled "Optimization Methods for the Insertion, Protection, and Detection of Digital Watermarks in Digitized Data"—Publication No. 20030219143—Nov. 27, 2003 (issued as U.S. Patent No. 7,095,874).

U.S. Appl. No. 11/482,654, filed Jul. 7, 2006, entitled "Optimization Methods for the Insertion, Protection, and Detection of Digital Watermarks in Digitized Data"—Publication No. 20060285722—Dec. 21, 2006 (issued as U.S. Patent No. 7,409,073).

U.S. Appl. No. 12/215,812, filed Jun. 30, 2008, entitled "Optimization Methods for the Insertion, Protection, and Detection of Digital Watermarks in Digitized Data"—Publication No. 20100002904—Jan. 7, 2010.

U.S. Appl. No. 09/594,719, filed Jun. 16, 2000, entitled "Utilizing Data Reduction in Steganographic and Cryptographic Systems" (issued as U.S. Patent No. 7,123,718).

U.S. Appl. No. 11/519,467, filed Sep. 12, 2006, entitled "Utilizing Data Reduction in Steganographic and Cryptographic Systems"—Publication No. 20070064940—Mar. 22, 2007 (issued as U.S. Patent No. 7,664,264).

U.S. Appl. No. 12/655,036, filed Dec. 22, 2009, entitled "Utilizing Data Reduction in Steganographic and Cryptographic Systems"—Publication No. 20100153734—Jun. 17, 2010.

U.S. Appl. No. 09/731,040, filed Dec. 7, 2000, entitled "Systems, Methods And Devices For Trusted Transactions"—Publication No. 20020010684—Jan. 24, 2002 (issued as U.S. Patent No. 7,159,116).

U.S. Appl. No. 11/512,701, filed Aug. 29, 2006, entitled "Systems, Methods And Devices For Trusted Transactions"—Publication No. 20070028113—Feb. 1, 2007.

U.S. Appl. No. 10/049,101, filed Feb. 8, 2002, entitled "A Secure Personal Content Server" (which claims priority to International Application No. PCT/US00/21189, filed Aug. 4, 2000, which claims priority to U.S. Appl. No. 60/147,134, filed Aug. 4, 1999, and to U.S. Appl. No. 60/213,489, filed Jun. 23, 2000)—(issued as U.S. Patent No. 7,475,246).

U.S. Appl. No. 12/287,443, filed Oct. 9, 2008, entitled "A Secure Personal Content Server" (which claims priority to International Application No. PCT/US00/21189, filed Aug. 4, 2000, which claims priority to U.S. Appl. No. 60/147,134, filed Aug. 4, 1999, and to U.S. Appl. No. 60/213,489, filed Jun. 23, 2000)—Publication No. 20090089427—Apr. 2, 2009.

U.S. Appl. No. 09/657,181, filed Sep. 7, 2000, entitled "Method and Device for Monitoring and Analyzing Signals" (issued as U.S. Patent No. 7,346,472).

U.S. Appl. No. 12/005,229, filed Dec. 26, 2007, entitled "Method and Device for Monitoring and Analyzing Signals"—Publication No. 20080109417—May 8, 2008 (issued as U.S. Patent No. 7,660,700).

U.S. Appl. No. 12/655,357, filed Dec. 22, 2009, entitled "Method and Device for Monitoring and Analyzing Signals"—Publication No. 20100106736—Apr. 29, 2010.

U.S. Appl. No. 10/805,484, filed Mar. 22, 2004, entitled "Method and Device for Monitoring and Analyzing Signals"(which claims priority to U.S. Appl. No. 09/671,739, filed Sep. 29, 2000, which is a CIP of U.S. Appl. No. 09/657,181)—Publication No. 20040243540—Dec. 2, 2004—(abandoned).

U.S. Appl. No. 09/956,262, filed Sep. 20, 2001, entitled "Improved Security Based on Subliminal and Supraliminal Channels for Data Objects"—Publication No. 20020056041—May 9, 2002 (issued as U.S. Patent No. 7,127,615).

U.S. Appl. No. 11/518,806, filed Sep. 11, 2006, entitled "Improved Security Based on Subliminal and Supraliminal Channels for Data Objects"—Publication No. 20080028222—Jan. 31, 2008.

U.S. Appl. No. 11/026,234, filed Dec. 30, 2004, entitled "Z-Transform Implementation of Digital Watermarks"—Publication No. 20050135615—Jun. 23, 2005 (issued as U.S. Patent No. 7,152,162).

U.S. Appl. No. 11/592,079, filed Nov. 2, 2006, entitled "Linear Predictive Coding Implementation of Digital Watermarks"—Publication No. 20070079131—Apr. 5, 2007 (issued as U.S. Patent No. 7,730,317).

U.S. Appl. No. 12/798,959, filed Apr. 14, 2010, entitled "Linear Predictive Coding Implementation of Digital Watermarks".

U.S. Appl. No. 09/731,039, filed Dec. 7, 2000, entitled "System and Methods for Permitting Open Access to Data Objects and for Securing Data within the Data Objects"—Publication No. 20020071556—Jun. 13, 2002 (issued as U.S. Patent No. 7,177,429).

U.S. Appl. No. 11/647,861, filed Dec. 29, 2006, entitled, "System and Methods for Permitting Open Access to Data Objects and for Securing Data within the Data Objects"—Publication No. 20070110240—Apr. 5, 2007 (issued as U.S. Patent No. 7,532,725).

U.S. Appl. No. 12/383,879, filed Mar. 30, 2009, entitled "System and Methods for Permitting Open Access to Data Objects and for Securing Data within the Data Objects"—Publication No. 20090190754—Jul. 30, 2009.

U.S. Patent No. 5,428,606, issued Jun. 27, 1995, entitled "Digital Commodities Exchange".

U.S. Patent No. 5,539,735, issued Jul. 23, 1996, entitled "Digital Information Commodities Exchange".

U.S. Patent No. 5,613,004, issued Mar. 18, 1997, entitled "Steganographic Method and Device".

U.S. Patent No. 5,687,236, issued Nov. 11, 1997, entitled "Steganographic Method and Device".
U.S. Patent No. 5,745,569, issued Apr. 28, 1998, entitled "Method for Stega-Protection of Computer Code".
U.S. Patent No. 5,822,432, issued Oct. 13, 1998, entitled "Method for Human Assisted Random Key Generation and Application for Digital Watermark System".
U.S. Patent No. 5,889,868, issued Jul. 2, 1996, entitled "Optimization Methods for the Insertion, Protection, and Detection of Digital Watermarks in Digitized Data".
U.S. Patent No. 5,905,800, issued May 18, 1999, entitled "Method & System for Digital Watermarking".
U.S. Patent No. 6,078,664, issued Jun. 20, 2000, entitled "Z-Transform Implementation of Digital Watermarks".
U.S. Patent No. 6,205,249, issued Mar. 20, 2001, entitled "Multiple Transform Utilization and Application for Secure Digital Watermarking".
U.S. Patent No. 6,522,767, issued Feb.18, 2003, entitled "Optimization Methods for the Insertion, Protection, and Detection of Digital Watermarks in Digitized Data".
U.S. Patent No. 6,598,162, issued Jul. 22, 2003, entitled "Method for Combining Transfer Function with Predetermined Key Creation".
U.S. Patent No. 6,853,726, issued Feb. 8, 2005, entitled "Z-Transform Implementation of Digital Watermarks".
U.S. Patent No. 7,007,166, issued Feb. 28, 2006, entitled "Method & System for Digital Watermarking".
U.S. Patent No. 7,035,049, issued Apr. 25, 2006, entitled "Multiple Transform Utilization and Application for Secure Digital Watermarking".
U.S. Patent No. 7,095,874, issued Aug. 22, 2006, entitled "Optimization Methods for the Insertion, Protection, and Detection of Digital Watermarks in Digitized Data".
U.S. Patent No. 7,107,451, issued Sep.12, 2006, entitled "Optimization Methods for the Insertion, Protection, and Detection of Digital Watermarks in Digital Data".
U.S. Patent No. 7,123,718, issued Oct. 17, 2006, entitled, "Utilizing Data Reduction in Steganographic and Cryptographic Systems".
U.S. Patent No. 7,127,615, issued Oct. 24, 2006, "Improved Security Based on Subliminal and Supraliminal Channels for Data Objects".
U.S. Patent No. 7,152,162, issued Dec. 19, 2006, entitled "Z-Transform Implementation of Digital Watermarks".
U.S. Patent No. 7,159,116, issued Jan. 2, 2007, entitled "Systems, Methods and Devices for Trusted Transactions".
U.S. Patent No. 7,177,429, issued Feb. 13, 2007, entitled "System and Methods for Permitting Open Access to Data Objects and for Securing Data within the Data Objects".
U.S. Patent No. 7,287,275, issued Oct. 23, 2007, entitled "Methods, Systems and Devices for Packet Watermarking and Efficient Provisioning of Bandwidth".
U.S. Patent No. 7,343,492, issued Mar. 11, 2008, entitled "Method and System for Digital Watermarking".
U.S. Patent No. 7,346,472, issued Mar. 18, 2008, entitled "Method and Device for Monitoring and Analyzing Signals".
U.S. Patent No. 7,362,775, issued Apr. 22, 2008, entitled "Methods for Assigning Values to and Exchanging Bandwidth Securitization Instruments" (title amended Sep. 6, 2000).
U.S. Patent No. 7,409,073, issued Aug. 5, 2008, entitled "Optimization Methods for the Insertion, Protection, and Detection of Digital Watermarks in Digitized Data".
U.S. Patent No. 7,457,962, issued Nov. 25, 2008, entitled "Optimization Methods for the Insertion, Protection, and Detection of Digital Watermarks in Digital Data".
U.S. Patent No. 7,475,246, issued Jan. 6, 2009, entitled "A Secure Personal Content Server".
U.S. Patent No. 7,530,102, issued May 5, 2009, entitled "Methods, Systems and Devices for Packet Watermarking and Efficient Provisioning of Bandwidth".
U.S. Patent No. 7,532,725, issued May 12, 2009, entitled "System and Methods for Permitting Open Access to Data Objects and for Securing Data within the Data Objects".
U.s. Patent No. 7,568,100, issued Jul. 28, 2009, entitled "Steganographic Method and Device".
U.S. Patent No. 7,647,502, issued Jan. 12, 2010, entitled "Optimization Methods for the Insertion, Protection, and Detection of Digital Watermarks in Digital Data".
U.S. Patent No. 7,647,503, issued Jan. 12, 2010, entitled "Optimization Methods for the Insertion, Protection, and Detection of Digital Watermarks in Digital Data".
U.S. Patent No. 7,660,700, issued Feb. 9, 2010, entitled "Method and Device for Monitoring and Analyzing Signals".
U.S. Patent No. 7,664,263, issued Feb. 16, 2010, entitled "Method for Combining Transfer Function with Predetermined Key Creation".
U.S. Patent No. 7,664,264, issued Feb. 16, 2010, entitled, "Utilizing Data Reduction in Steganographic and Cryptographic Systems".
U.S. Patent No. 7,664,958, issued Feb. 16, 2010, entitled "Optimization Methods for the Insertion, Protection, and Detection of Digital Watermarks in Digital Data".
U.S. Patent No. 7,730,317, issued Jun. 1, 2010, entitled "Linear Predictive Coding Implementation of Digital Watermarks".
U.S. Patent No. 7,738,659, issued Jun. 15, 2010, entitled "Multiple Transform Utilization and Application for Secure Digital Watermarking".
U.S. Patent No. 7,761,712, issued Jul. 20, 2010, entitled "Steganographic Method and Device".
U.S. Patent No. 7,770,017, issuedd Aug. 3, 2010, entitled "Method and System for Digital Watermarking".
U.S. Patent No. 7,779,261, to be issued Aug. 17, 2010, entitled "Method and System for Digital Watermarking".
PCT Application No. PCT/US95/08159, filed Jun. 26, 1995, entitled, "Digital Information Commodities Exchange with Virtual Menuing".
PCT Application No. PCT/US96/10257, filed Jun. 7, 1996, entitled, "Steganographic Method and Device"—corresponding to—EPO Application No. 96919405.9, entitled "Steganographic Method and Device".
PCT Application No. PCT/US97/00651, filed Jan. 16, 1997, entitled, "Method for Stega-Cipher Protection of Computer Code"—corresponding to AU199718294A (not available).
PCT Application No. PCT/US97/00652, filed Jan. 17, 1997, entitled, "Method for an Encrypted Digital Watermark"—corresponding to AU199718295A.
PCT Application No. PCT/US97/11455, filed Jul. 2, 1997, entitled, "Optimization Methods for the Insertion, Protection and Detection of Digital Watermarks in Digitized Data"—corresponding to AU199735881A (not available).
PCT Application No. PCT/US99/07262, filed Apr. 2, 1999, entitled, "Multiple Transform Utilization and Applications for Secure Digital Watermarking"—corresponding to—Japan App. No. 2000-542907, entitled "Multiple Transform Utilization and Application for Secure Digital Watermarking".
PCT Application No. PCT/US00/06522, filed Mar. 14, 2000, entitled, "Utilizing Data Reduction in Steganographic and Cryptographic Systems".
PCT Application No. PCT/US00/18411, filed Jul. 5, 2000, entitled, "Copy Protection of Digital Data Combining Steganographic and Cryptographic Techniques"—corresponding to AU200060709A (not available).
PCT Application No. PCT/US00/21189, filed Aug. 4, 2000, entitled, "A Secure Personal Content Server".
PCT Application No. PCT/US00/33126, filed Dec. 7, 2000, entitled, "Systems, Methods and Devices for Trusted Transactions"—corresponding to AU200120650A5 (not available).
EPO Divisional Patent Application No. 07112420.0, entitled "Steganographic Method and Device" (corresponding to PCT Application No. PCT/US96/10257, filed Jun. 7, 1996, entitled, "Steganographic Method and Device".

* cited by examiner

STEGANOGRAPHIC METHOD AND DEVICE

CROSS REFERENCE TO RELATED APPLICATIONS

This application is a continuation of pending U.S. patent application Ser. No. 08/999,766, filed Jul. 23, 1997, which is a division of U.S. patent application Ser. No. 08/775,216, filed Dec. 31, 1996, now U.S. Pat. No. 5,687,236 (which is a division of U.S. patent application Ser. No. 08/489,172, filed Jun. 7, 1995 (now U.S. Pat. No. 5,613,004)). The previously identified patents and/or patent applications are hereby incorporated by reference, in their entireties.

DEFINITIONS

Several terms of art appear frequently in the following. For ease of reference they are defined here as follows:

"Content" refers to multimedia content. The term encompasses the various types of information to be processed in a multimedia entertainment system. Content specifically refers to digitized audio, video or still images in the context of this discussion. This information may be contained within files on a multimedia computer system, the files having a particular format specific to the modality of the content (sound, images, moving pictures) or the type of systems, computer or otherwise, used to process the content.

"Digitized" refers to content composed of discrete digital samples of an otherwise analog media, which approximate that media inside a computer or other digital device. For instance, the sound of music occurs naturally, and is experienced by humans as an analog (continuous) sound wave. The sound can be digitized into a stream of discrete samples, or numbers, each of which represents an approximate value of the amplitude of the real analog wave at a particular instant in time. These samples can be stored in files in a computer and then used to recreate the original sound wave to a high degree of accuracy. In general, content entering a digital system is digitized by Analog to Digital converters (A/D) and analog media are recreated by the digital system using a Digital to Analog (D/A) converter. In the context of this discussion content is always digitized content.

"Cryptography" is a field covering numerous techniques for scrambling information conveying messages so that when the message is conveyed between the sender and receiver an unintended party who intercepts this message cannot read it, or extract useful information from it.

A "Public Key Cryptosystem" is a particular cryptographic system where all parties possess pairs of keys for encryption and decryption. Parties to this type of system freely distribute their public keys, which other may use to encrypt messages to the owner of the public key. Such messages are decrypted by the receiver with the private key. Private keys are never distributed. A message encrypted with a public key can only be decrypted with the corresponding private key, and vice versa. A message encrypted with a private key is said to have been signed by the owner of that key. Anyone in possession of the public key may decrypt the message and known that it was encrypted, and thus signed, by the owner of the public key, since only they possess the corresponding private key.

"Steganography" is a field distinguished from cryptography, but associated with it, that covers numerous methods for hiding an informational message within some other medium, perhaps another unrelated message, in such a manner that an unintended party who intercepts the medium carrying the hidden message does not know it contains this hidden message and therefore does not obtain the information in the hidden message. In other words, steganography seeks to hide messages in plain view.

BACKGROUND OF THE INVENTION

In the current environment of computer networks and the proliferation of digital or digitized multimedia content which may be distributed over such networks, a key issue is copyright protection. Copyright protection is the ability to prevent or deter the proliferation of unauthorized copies of copyrighted works. It provides a reasonable guarantee that the author of a copyrighted work will be paid for each copy of that work.

A fundamental problem in the digital world, as opposed to the world of physical media, is that a unlimited number of perfect copies may be made from any piece of digital or digitized content. A perfect copy means that if the original is comprised of a given stream of numbers, then the copy matches the original, exactly, for each number in the stream. Thus, there is no degradation of the original signal during the copy operation. In an analog copy, random noise is always introduced, degrading the copied signal.

The act of making unlicensed copies of some content, digital or analog, whether audio, video, software or other, is generally known as piracy. Piracy has been committed for the purpose of either profit from the sale of such unlicensed copies, or to procure for the "pirate" a copy of the content for personal use without having paid for it.

The problem of piracy has been made much worse for any type of content by the digitization of content. Once content enters the digital domain, an unlimited number of copies may be made without any degradation, if a pirate finds a way to break whatever protection scheme was established to guard against such abuses, if any. In the analog world, there is generally a degradation in the content (signal) with each successive copy, imposing a sort of natural limit on volume of piracy.

To date, three general types of schemes have been implemented in an attempt to protect copyrights.

1) Encryption
2) Copy Protection
3) Content Extensions

Copy Protection and Content Extensions generally apply in the digital world only, while a scheme related to Encryption, commonly known as scrambling, may be applied to an analog signal. This is typical in analog cable systems.

Encryption scrambles the content. Before the content is made ready for delivery, whether on floppy disk, or over a network, it must be encrypted, or scrambled. Once the content has been encrypted, it cannot be used until it is decrypted, or unscrambled. Encrypted audio data might sound like incomprehensible screeching, while an encrypted picture or video might appear as random patterns on a screen. The principle of encryption is that you are free to make as many copies as you want, but you can't read anything that makes sense until you use a special key to decrypt, and you can only obtain the key by paying for the content.

Encryption has two problems, however. 1) Pirates have historically found ways to crack encryption, in effect, obtaining the key without having paid for it; and 2) Once a single legitimate copy of some content has been decrypted, a pirate is now free to make unlimited copies of the decrypted copy. In effect, in order to sell an unlimited quantity of an encrypted piece of software, the pirate could simply buy one copy, which they are entitled to decrypt.

Copy Protection includes various methods by which a software engineer can write the software in a clever manner to determine if it has been copied, and if so to deactivate itself. Also included are undocumented changes to the storage format of the content. Copy protection was generally abandoned by the software industry, since pirates were generally just as clever as the software engineers and figured out ways to modify their software and deactivate the protection. The cost of developing such protection was not justified considering the level of piracy which occurred despite the copy protection.

Content Extension refers to any system which attaches some extra information to the original content which indicates whether or not a copy may be made. A software or hardware system must be specifically built around this scheme to recognize the additional information and interpret it in an appropriate manner. An example of such a system is the Serial Copyright Management System embedded in Digital Audio Tape (DAT) hardware. Under this system, additional information is stored on the disc immediately preceding each track of audio content which indicates whether or not it can be copied. The hardware reads this information and uses it accordingly.

A fundamental problem with Encryption and Content Extension is the "rogue engineer". An employee who helped design such a system or an individual with the knowledge and means to analyze such a system can modify it to ignore the copyright information altogether, and make unlicensed copies of the content. Cable piracy is quite common, aided by illicit decoder devices built by those who understand the technical details of the cable encryption system. Although the cable systems in question were actually based on analog RF signals, the same principle applies to digital systems.

The practical considerations of weak encryption schemes and rogue engineers have served to limit the faith which may be put in such copyright protection schemes. The invention disclosed herein serves to address these problems with conventional systems for digital distribution. It provides a way to enforce copyright online. The invention draws on techniques from two fields, cryptography, the art of scrambling messages so that only the intended recipient may read them, and steganography, a term applied to various techniques for obscuring messages so that only the intended parties to a message even know that a message has been sent, thus it is termed herein as a stega-cipher. The stega-cipher is so named because it uses the steganographic technique of hiding a message in multimedia content, in combination with multiple keys, a concept originating in cryptography. However, instead of using the keys to encrypt the content, the stega-cipher uses these keys to locate the hidden message within the content. The message itself is encrypted which serves to further protect the message, verify the validity of the message, and redistribute the information in a random manner so that anyone attempting to locate the message without the keys cannot rely on pre-supposed knowledge of the message contents as a help in locating it.

SUMMARY OF THE INVENTION

The invention disclosed herein combines two techniques, steganography—obscuring information that is otherwise in plain sight, and cryptography—scrambling information that must be sent over unsecured means, in a manner such that only the intended recipient may successfully unscramble it. The net effect of this system is to specifically watermark a piece of content so that if it is copied, it is possible to determine who owned the original from which the copies were made, and hence determine responsibility for the copies. It is also a feature of the system to uniquely identify the content to which it is applied.

For a comprehensive discussion of cryptography, its theory, applications and specific algorithms, see APPLIED CRYPTOGRAPHY, by Bruce Schneier, which is herein incorporated by reference at pages 66-68, 387-392.

Steganography is discussed briefly in THE CODE BREAKERS by David Kahn, which is herein incorporated by reference at pages xiii, 81-83, 522-526, and 873. An example application, Stego by Romana Machado, is also available for the Apple Macintosh. Stego can be found at the internet uniform resource locator "ftp://sumex-aim.stanford.edu/infomac/cmp/stego10a2.hqx". This application demonstrates in a simple steganographic technique to encode a text message into a graphical image without significantly distorting the image.

The invention improves upon the prior art by providing a manner for protecting copyright in the digital domain, which neither steganography or cryptography does. It improves specifically on steganography by making use of special keys which dictate exactly where within a larger chunk of content a message is to be hidden, and makes the task of extracting such a message without the proper key the equivalent of looking for a needle in a haystack.

The information encoded by the Stega-Cipher process serves as a watermark which identifies individual copies of content legally licensed to specific parties. It is integral with the content. It cannot be removed by omission in a transmission. It does not add any overhead to signal transmission or storage. It does allow the content to be stored to and used with traditional offline analog and digital media, without modification or significant signal degradation. That is, it forces would-be pirates to damage the content in order to guarantee the disabling of the watermark. These aspects of the stega-cipher all represent improvements to the art.

The invention described herein is used for protecting and enforcing copyrights in the digital or on-line domain, where there are no physical limitations on copying copyrighted content.

The invention uniquely identifies every copy of multimedia content made using the invention, composed of digitized samples whether compressed or uncompressed, including but not limited to still digital images, digital audio, and digital video.

The invention is for use in meterware or pay-by-use systems where an online user incurs a charge each time they access a particular piece of content, or uses a software title.

The invention is for use as a general improvement to cryptographic techniques to increase the complexity of crytanalysis on a given cipher.

It is considered that the method and steps of the present invention will be modified to account for the effects of lossy compression schemes on the samples and particularly includes modification to handle MPEG compressed audio and video.

It is considered that statistical data spreading and recovery techniques, error coding or spread spectrum processing techniques might be applied in the invention to handle the effects of lossy compression, or counter the effects of a randomization attack.

It is considered that the apparatus described might be further specialized and optimized in hardware by replacing general purpose data buses and CPU or DSP driven operations with hardwired circuitry, incorporated in one or more special purpose ICs.

It is considered that the apparatus will be modeled and implemented in software on general purpose computer platforms.

It is considered that stega-cipher hardware could be embedded in a consumer electronics device and used to not only identify content and copyright, but to enable use of that content.

DETAILED DESCRIPTION

I. Digital Copyright Stega-Cipher Protocol and the Decode/Encode Program

The purpose of the program described here is to watermark digital multimedia content for distribution to consumers through online services in such a way as to meet the following criteria Given a unique piece of multimedia content, composed of digitized samples, it is desirable to:
1) Uniquely identify this particular piece of content from others in a manner which is secure and undeniable (e.g. to known whether a digital audio recording is "My Way" by Frank Sinatra, or "Stairway to Heaven", by Led Zeppelin), and in a manner such as this identification can be performed automatically by an electronic device or mechanism.
2) Uniquely identify the copyright owner of the content, and the terms under which it may be distributed in general, in a manner which is secure and undeniable.
3) At such time as is necessary, additionally, uniquely identify in a secure and undeniable manner the licensed publisher who received a particular copy of the content, and the terms under which they may redistribute or resell it.
4) At such time as is necessary, additionally, uniquely identify in a secure and undeniable manner, the licensed subscriber who received a particular copy of the content from the publisher described in item 3.

The program described in more detail below combines the techniques of cryptography and steganography to hide a securely encrypted digital copyright certificate which contains information satisfying the criteria listed above, in such a manner as to be integral with the content, like a watermark on paper, so that possession of the content dictates possession of the watermark information. In addition, the watermark cannot be "found" or successfully decoded, without possession of the correct "masks" or keys, available only to those legitimately authorized, namely, those parties to a commercial transaction involving the sale of a copy of the content. Finally, the ability to distribute such watermarked content in a system which implements the watermark scheme is denied without a successfully decoded watermark. Because well known and tested cryptographic techniques are used to protect the certificate itself, these certificates are virtually impossible to forge. Finally, the watermark cannot be erased without significantly damaging the content.

The basic program represents a key part of the invention itself. This program is then used as the method by which copyright information is to be associated in an integral manner with the content. This is a concept absent from copy protection, encryption and content extension schemes. The copyright information itself can be made undeniable and unforgeable using cryptographic techniques, so that through it an audit trail of ownership may be established for each copy of a given piece of content, thus customizing each copy to a particular owner, in a way that can be used to identify the owner.

The value of the stega-cipher is that it provides a way to watermark the content in a way that changes it slightly, but does not impact human perception significantly. And, furthermore, that it is made difficult to defeat since one must know exactly where the information resides to extract it for analysis and use in forgery attempts, or to remove it without overly degrading the signal. And, to try to force copyright information one must first be able to analyze the encrypted copyright information, and in order to do that, one must be able to find it, which requires masks.

II. Example Embodiment of General Processing

Digital audio data is represented by a series of samples in 1 dimension, $$\{S_1, S_2, S_3 \ldots S_n\}$$

This series is also referred to as a sample stream. The sample stream approximates an analog waveform of sound amplitude over time. Each sample represents an estimate of the wave amplitude at the instant of time the sample is recorded. For monaural audio, there is one such sample stream. Stereo audio is comprised of two sample streams, one representing the right channel, and the other representing the left. Each stream is used to drive a corresponding speaker to reproduce the stereo sound.

What is referred to as CD quality audio is characterized by 16 bit (2 byte) stereo samples, recorded at 44.1 Khz, or 44,100 samples per second in each channel. The dynamic range of sound reproduction is directly proportional to the number of bits per sample. Some lower quality recordings are done at 8 bits. A CD audio recording can be stored using any scheme for containing the 2 sample streams in their entirety. When these streams are played back at the same frequency they were recorded at, the sound recorded is reproduced to a high degree of accuracy.

The sample is processed in order from first sample to last. For the purpose of the invention disclosed, the stream is separated into sample windows, each of which has a fixed number of consecutive samples from the stream, and where windows do not overlap in the sample stream. Windows may be contiguous in the sample stream. In this discussion assume each window contains 128 samples, and that windows are contiguous. So, the windows within the stream look like $$\{[S_1, S_2, S_3 \ldots S_{128}], [S_{129}, S_{130}, S_1 \ldots S_{256}], \ldots [S_{n-128} \ldots S_n]\}$$

where [ . . . ] denotes each window and any odd samples at the end of the stream which do not completely fill a window can be ignored, and simply passed through the system unmodified.

These windows will be used as input for the discrete Fast Fourier Transform (and its inverse) operation.

Briefly, Fourier Transform methods are based on the principle that a complex waveform, expressed as amplitude over time and represented by a sample stream, is really the sum of a number of simple waveforms, each of which oscillate at different frequencies.

By complex, it is meant that the value of the next sample is not easily predicted from the values of the last N samples or the time of the sample. By simple it is meant that the value of the sample is easily predictable from the values of the last N samples and/or the time of the sample.

The sum of multiple simple waves is equivalent to the complex wave. The discrete FFT and its inverse simply translate a limited amount of data from one side of this equivalence to the other, between the complex waveform and the sum of simple waves. The discrete FFT can be used to translate a series of samples representing amplitude over time (the complex wave, representing a digital audio recording) into the same number of samples representing total spectral energy in a given range of frequencies (the simple wave components) at a particular instant of time. This instant is the time in the middle of the original amplitude/time samples. The inverse discrete FFT translates the data in the other direction, producing the complex waveform, from its simpler parts.

Each 128 sample window will be used as an input to the discrete FFT, resulting in 128 bins representing each of 128 frequency bands, ranging from 0 Hz to 22 Khz (the Nyquist frequency, or ½ the sampling rate).

Information can be encoded into the audio signal in the frequency domain or in the time domain. In the latter case, no FFT or inverse FFT is necessary. However, encoding in the frequency domain is recommended, since its effects are scattered over the resultant time domain samples, and not easily predicated. In addition, frequency domain encoding makes it more likely that randomization will result in noticeable artifacts in the resultant signal, and therefore makes the stega-cipher more defensible against such attacks. It is in the frequency domain that additional information will be encoded into the audio signal for the purpose of this discussion. Each frequency band in a given time slice can potentially be used to store a small portion of some additional information to be added to the signal. Since these are discrete estimates, there is some room for error which will not significantly effect the perceived quality of the signal, reproduced after modification, by the inverse FFT operation. In effect, intentional changes, which cannot be distinguished from random variations are introduced in the frequency domain, for the purpose of storing additional information in the sample stream.

These changes are minimized so as not to adversely affect the perceived quality of the reproduced audio signal, after it has been encoded with additional information in the manner described below. In addition, the location of each of these changes is made virtually impossible to predict, an innovation which distinguishes this scheme from simple steganographic techniques.

Note that this process differs from the Nagata, et al. U.S. Pat. Nos. 4,979,210 and 5,073,925, which encode information by modulating an audio signal in amplitude/time domain. It also differs in that the modulations introduced in the Nagata process (which are at very low amplitude and frequency relative to the carrier wave as to remain inaudible) carry only copy/don't copy information, which is easily found and circumvented by one skilled in the art. Also, there is no limitation in the stega-cipher process at to what type of information can be encoded into the signal, and there is more information storage capacity, since the encoding process is not bound by any particular frequency of modulation but rather by the number of samples available. The granularity of encoding in the stega-cipher is determined by the sample window size, with potentially 1 bit of space per sample or 128 bits per window (a secure implementation will halve this to 64 bits). In Nagata, et al. the granularity of encoding is fixed by the amplitude and frequency modulation limits required to maintain inaudibility. These limits are relatively low, and therefore make it impractical to encode more than simple copy/don't copy information using the Nagata process.

III. Example Embodiment of Encoding and Decoding

A modification to standard steganographic technique is applied in the frequency domain described above, in order to encode additional information into the audio signal.

In a scheme adapted from cryptographic techniques, 2 keys are used in the actual encode and decode process. For the purposes of this invention the keys are referred to as masks. One mask, the primary, is applied to the frequency axis of FFT results, the other mask is applied to the time axis (this will be called the convolution mask). The number of bits comprising the primary mask are equal to the sample window size in samples (or the number of frequency bands computed by the FFT process), 128 in this discussion. The number of bits in the convolution mask are entirely arbitrary. This implementation will assume a time mask of 1024 bits. Generally the larger the key, the more difficult it is to guess.

Prior to encoding, the primary and convolution masks described above are generated by a cryptographically secure random generation process. It is possible to use a block cipher like DES in combination with a sufficiently pseudo-random seed value to emulate a cryptographically secure random bit generator. These keys will be saved along with information matching them to the sample stream in question in a database for use in decoding, should that step become necessary.

Prior to encoding, some additional information to be encoded into the signal is prepared and made available to the encoder, in a bit addressable manner (so that it may be read one bit at a time). If the size of the sample stream is known and the efficiency characteristics of the stega-cipher implementation are taken into account, a known limit may be imposed on the amount of this additional information.

The encoder captures one sample window at a time from the sample stream, in sequential, contiguous order. The encoder tracks the sequential number of each window it acquires. The first window is 0. When the number of windows processed reaches the number of bits in the window mask, minus one, the next value of the window counter will be reset to 0.

This counter is the convolution index or phase. In the current implementation it is used as a simple index into the convolution bitmask. In anticipated developments it will be used to perform convolution operations on the convolution mask to determine which bit to use. For instance the mask might by rotated by a number corresponding to the phase, in bits to the left and XORed with the primary mask to produce a new mask, which is then indexed by the phase. There are many possibilities for convolution.

The encoder computes the discrete FFT of the sample window.

Starting with the lowest frequency band, the encoder proceeds through each band to the highest, visiting each of the 128 frequency bands in order. At each band value, the encoder takes the bit of the primary mask corresponding to the frequency band in question, the bit of the convolution mask corresponding to the window in question, and passes these values into a boolean function. This function is designed so that it has a near perfectly random output distribution. It will return true for approximately 50% of its input permutations, and false for the other 50%. The value returned for a given set of inputs is fixed, however, so that it will always return the same value given the same set of inputs.

If the function returns true, the current frequency band in the current window is used in the encoding process, and represents a valid piece of the additional information encoded in the signal. If the function returns false, this cell, as the frequency band in a given window is called, is ignored in the process. In this manner it is made extremely difficult to extract the encoded information from the signal without the use of the exact masks used in the encoding process. This is one place in which the stega-cipher process departs from traditional steganographic implementations, which offer a trivial decode opportunity if one knows the information is present. While this increases the information storage capacity of the carrier signal, it makes decoding trivial, and further degrades the signal. Note that it is possible and desirable to modify the boolean cell flag function so that it returns true <50% of the time. In general, the fewer cells actually used in the encode, the more difficult they will be to find and the less degradation of content will be caused, provided the function is designed correctly. There is an obvious tradeoff in storage capacity for this increased security and quality.

The encoder proceeds in this manner until a complete copy of the additional information has been encoded in the carrier signal. It will be desirable to have the encoder encode multiple copies of the additional information continuously over the duration of the carrier signal, so that a complete instance of this information may be recovered from a smaller segment of a larger signal which has been split into discontinuous pieces or otherwise edited. It is therefore desirable to minimize the size of the information to be encoded using both compact design and pre-encoding compression, thus maximizing redundant encoding, and recoverability from smaller segments. In a practical implementation of this system it is likely the information will be first compressed by a known method, and then encrypted using public-key techniques, before being encoded into the carrier signal.

The encoder will also prepare the package of additional information so that it contains an easily recognizable start of message delimeter, which can be unique to each encoding and stored along with the keys, to serve as a synchronization signal to a decoder. The detection of this delimeter in a decoding window signifies that the decoder can be reasonably sure it is aligned to the sample stream correctly and can proceed in a methodic window by window manner. These delimeters will require a number of bits which minimizes the probability that this bit sequence is not reproduced in a random occurrence, causing an accidental misalignment of the decoder. A minimum of 256 bits is recommended. In the current implementation 1024 bits representing a start of message delimeter are used. If each sample is random, then each bit has a 50% probably of matching the delimeter and the conditional probability of a random match would be $\frac{1}{2}^{1024}$. In practice, the samples are probably somewhat less than random, increasing the probability of a match somewhat.

The decode process uses the same masks in the same manner, only in this case the information is extracted one bit at a time from the carrier signal.

The decoder is assumed to have access to the proper masks used to encode the information originally. These masks might be present in a database, which can be indexed by a value, or values computed from the original content, in a manner insensitive to the modifications to the content caused by the stega-cipher process. So, given an arbitrary piece of content, a decoder might first process the content to generate certain key values, and then retrieve the decode masks associated with the matching key values from the database. In the case where multiple matches occur, or none are found, it is conceivable that all mask sets in the database could be tried sequentially until a valid decode is achieved, or not, indicating no information is present.

In the application of this process, it is anticipated that encoding operations may be done on a given piece of content up to 3 times, each adding new information and using new masks, over a sub-segment of the content, and that decode operations will be done infrequently. It is anticipated that should it become necessary to do a search of a large number of masks to find a valid decode, that this process can be optimized using a guessing technique based on close key matching, and that it is not a time critical application, so it will be feasible to test large numbers of potential masks for validity on a given piece of content, even if such a process takes days or weeks on powerful computers to do a comprehensive search of known mask sets.

The decode process is slightly different in the following respect. Whereas the encoding process can start at any arbitrary point in the sample stream, the decode process does not known where the encode process began (the exact offset in samples to the start of the first window). Even though the encode process, by convention, starts with sample 0, there is no guarantee that the sample stream has not been edited since encoding, leaving a partial window at the start of the sample stream, and thus requiring the decoder to find the first complete window to start the decode. Therefore, the decode process will start at the first sample, and shift the sample window along by 1 sample, keeping the window index at 0, until it can find a valid decode delimeter encoded in the window. At this point, the decoder knows it has synchronized to the encoder, and can then proceed to process contiguous windows in a more expedient manner.

Example Calculations based on the described implementations for adding copyright certificate information to CD quality digital audio:

In a stream of samples, every 128 samples will contain, on average 64 bits of certificate related information. Digital audio is composed of 16 bit samples, at 44.1 Khz, or 44,100 samples per second. Stereo audio provides 2 streams of information at this rate, left and right, or 88,200 samples per second. That yields approximately 689 contiguous sample windows (of 128 samples) per second in which to encode information. Assume a song is 4 minutes long, or 240 seconds. This yields 240*689=165,360 windows, which on average (50% utilization) contain 64 bits (8 bytes) each of certificate information. This in turn gives approximately 1291 Kb of information storage space per 4 minute stereo song (1.2 MB). There is ample room for redundant encoding of information continuously over the length of the content. Encoding 8 bytes for every 256 bytes represents 3.1% of the signal information. Assuming that a copyright certificate requires at most approximately 2048 bytes (2K), we can encode the same certificate in 645 distinct locations within the recording, or approximately every $\frac{37}{100}$ths of a second.

Now to account for delimeters and synchronization information. Assuming a sync marker of 1024 bits to avoid random matches, then we could prefix each 2K certificate block with this 1024 bit marker. It takes 256 windows to store 2K, and under this proposed scheme, the first 16 windows are reserved for the sync marker. A decoder could search for this marker by progressively matching each of the first 16 windows (64 bits at a time) against the corresponding portion of the sync marker. The decoder could reset the match advancing through the sample stream, as soon as one window did not conform to the sync marker. and proceed in this manner until it matches 16 consecutive windows to the marker, at which point it is synchronized.

Under this scheme, 240 windows, or 1.92K remain for storing certificate information, which is not unreasonable.

IV. Possible Problems, Attacks and Subsequent Defenses

A. Randomization

The attacker simply randomizes the least significant bits of each data point in the transform buffer, obliterating the synchronization signal and the watermark. While this attack can remove the watermark, in the context in which stega-cipher is to be used, the problem of piracy is kept to a minimum at least equal to that afforded by traditional media, since the system will not allow an unwatermarked piece of content to be traded for profit and watermarks cannot be forged without the proper keys, which are computationally difficult to obtain by brute-force or crytanalysis. In addition, if the encoding is managed in such a way as to maximize the level of changes to the sample stream to be just at the threshold below human perception, and the scheme is implemented to anticipate randomization attempts, it is possible to force the randomization level to exceed the level that can be perceived and create destructive artifacts in the signal, in much the same manner as a VHS cassette can be manufactured at a minimal signal level, so that a single copy results in unwatchable static.

B. Low Bit-Depth Bitmaps (Black & White Images)

These bitmaps would be too sensitive to the steganization process, resulting in unacceptable signal degradation, and so are not good candidates for the stega-cipher process. The problem may be circumvented by inflating bit-depth, although this is an inefficient use of space and bandwidth.

C. Non-Integer Transforms

The FFT is used to generate spectral energy information for a given audio signal. This information is not usually in integer format. Computers use methods of approximation in these cases to represent the real numbers (whole numbers plus fractional amounts). Depending on the exact value of the number to be represented slight errors, produced by rounding off the nearest real number that can be completely specified by the computer occur. This will produce some randomization in the least significant bit or bits. In other words, the same operation on the same sample window might yield slightly different transform values each time. It is possible to circumvent this problem using a modification to the simple LSB steganographic technique described later. Instead of looking at the LSB, the stega-cipher can use an energy quantization technique in place of the LSB method. Some variant of rounding the spectral energy values up or down, with a granularity greater than the rounding error should work, without significantly degrading the output samples.

V. A Method and Protocol for Using the Stega-Cipher

The apparatus described in the claims below operates on a window by window basis over the sample stream. It has no knowledge of the nature of the specific message to be encoded. It merely indexes into a bit stream, and encodes as many of those bits as possible into a given sample window, using a map determined by the given masks.

The value of encoding information into a single window in the sample stream using such an apparatus may not be inherently apparent until one examines the manner in which such information will be used. The protocol discussed in this section details how messages which exceed the encoding capacity of a single sample window (128 samples) may be assembled from smaller pieces encoded in the individual windows and used to defend copyrights in an online situation.

An average of 64 bits can be encoded into each window, which equals only 8 bytes. Messages larger than 8 bytes can be encoded by simply dividing the messages up and encoding small portions into a string of consecutive windows in the sample stream. Since the keys determine exactly how many bits will be encoded per window, and an element of randomness is desirable, as opposed to perfect predictability, one cannot be certain exactly how many bits are encoded into each window.

The start of each message is marked by a special start of message delimeter, which, as discussed above is 1024 bits, or 128 bytes. Therefore, if precisely 8 bytes are encoded per window, the first 16 windows of any useable message in the system described here are reserved for the start of message delimeter. For the encoder, this scheme presents little challenge. It simply designates the first sample window in the stream to be window 0, and proceeds to encode the message delimeter, bit-by-bit into each consecutive window. As soon as it has processed the last bit of the SOM delimeter it continues by encoding 32 bits representing the size, in bytes of the complete message to follow. Once the 32nd and final bit of the size is encoded, the message itself is encoded into each consecutive window, one bit at a time. Some windows may contain more encoded bits than others, as dictated by the masks. As the encoder processes each window in the content it increments its window counter. It uses this counter to index into the window mask. If the number of windows required to encode a complete message is greater than the size of this mask, 256 bits in this case, or 256 windows, then it simply resets the counter after window 255, and so on, until a complete message is encoded. It can then start over, or start on a new message.

The decoder has a bigger challenge to face. The decoder is given a set of masks, just like encoder. Unlike the encoder, the decoder cannot be sure that the first series of 128 samples it receives are the window 0 start of message, encoded by the decoder. The sample stream originally produced by an encoder may have been edited by clipping its ends randomly or splicing pieces together. In that case, the particular copy of the message that was clipped is unrecoverable. The decoder has the start of message delimeter used to encode the message that the decoder is looking for. In the initial state, the decoder assumes the first window it gets is window 0. It then decodes the proper number of bits dictated by the masks it was given. It compares these bits to the corresponding bits of the start of message delimeter. If they match, the decoder assumes it is still aligned, increments the window counter and continues. If the bits do not match, the decoder knows it is not aligned. In this case, it shifts once more sample onto the end of the sample buffer, discarding the first sample, and starts over. The window counter is set to 0. The decoder searches one sample at a time for an alignment lock. The decoder proceeds in this manner until it has decoded a complete match to the start of message delimeter or it exhausts the sample stream without decoding a message. If the decoder can match completely the start of message delimeter bit sequence, it switches into aligned mode. The decoder will now advance through the sample stream a full window at a time (128 samples). It proceeds until it has the 32 bits specifying the message size. This generally won't occupy more than 1 complete window. When the decoder has locked onto the start of message delimeter and decoded the message size, it can now proceed to decode as many consecutive additional windows as necessary until it has decoded a complete message. Once it has decoded a complete message, the state of the decoder can be reset to un-synchronized and the entire process can be repeated starting with the next 128 sample window. In this manner it is not absolutely necessary that encoding windows be contiguous in the sample stream. The decoder is capable of handling random intervals between the end of one message and the start of another.

It is important to note that the circuit for encoding and decoding a sample window does not need to be aware of the nature of the message, or of any structure beyond the start of message delimeter and message size. It only needs to consider a single sample window, its own state (whether the decoder is misaligned, synchronizing, or synchronized) and what bits to encode/decode.

Given that the stega-cipher apparatus allows for the encoding and decoding of arbitrary messages in this manner, how can it be used to protect copyrights?

The most important aspect of the stega-cipher in this respect is that fact that it makes the message integral with the content, and difficult to remove. So it cannot be eliminated simply by removing certain information prepended or appended to the sample stream itself. In fact, removing an arbitrary chunk of samples will not generally defeat the stega-cipher either.

Given that some information can thus be integrated with the content itself, the question is then how best to take advantage of this arrangement in order to protect copyrights.

The following protocol details how the stega-cipher will be exploited to protect copyrights in the digital domain.

In a transaction involving the transfer of digitized content, there are at least 3 functions involved:

The Authority is a trusted arbitrator between the two other functions listed below, representing parties who actually engage in the transfer of the content. The Authority maintains a database containing information on the particular piece of content itself and who the two parties engaged in transferring the content are. The Authority can perform stega-cipher encoding and decoding on content.

The Publisher, or online distributor is the entity which is sending the copyrighted content to another party. The Publisher can perform stega-cipher encoding and decoding on content.

The Consumer is the person or entity receiving the copyrighted content, generally in exchange for some consideration such as money. The consumer cannot generally perform stega-cipher encoding or decoding on content.

Each of these parties can participate in a message exchange protocol using well known public-key cryptographic techniques. For instance, a system licensing RSA public key algorithms might be used for signed and encrypted message exchange. This means that each party maintains a public key/private key pair, and that the public keys of each party are freely available to any other party. Generally, the Authority communicates via electronic links directly only to the Publisher and the Consumer communicates directly only with the publisher.

Below is an example of how the protocol operates from the time a piece of content enters an electronic distribution system to the time it is delivered to a Consumer.

A copyright holder (an independent artist, music publisher, movie studio, etc.) wishes to retail a particular title online. For instance, Sire Records Company might wish to distribute the latest single from Seal, one of their musical artists, online. Sire delivers a master copy of this single, "Prayer for the Dying", to the Authority, Ethical Inc. Ethical converts the title into a format suitable for electronic distribution. This may involve digitizing an analog recording. The title has now become content in the context of this online distribution system. The title is not yet available to anyone except Ethical Inc., and has not yet been encoded with the stega-cipher watermark. Ethical generates a Title Identification and Authentication (TIA) certificate. The certificate could be in any format. In this example it is a short text file, readable with a small word-processing program, which contains information identifying the title
the artist
the copyright holder
the body to which royalties should be paid
general terms for publishers' distribution
any other information helpful in identifying this content Ethical then signs the TIA with its own private key, and encrypts the TIA certificate plus its signature with its own public key. Thus, the Ethical can decrypt the TIA certificate at a later time and know that it generated the message and that the contents of the message have not been changed since generation.

Sire Records, which ultimately controls distribution of the content, communicates to the Ethical a specific online Publisher that is to have the right of distribution of this content. For instance, Joe's Online Emporium. The Authority, Ethical Inc. can transmit a short agreement the Distribution Agreement to the Publisher, Joe's Online Emporium which lists the content title
the publisher's identification
the terms of distribution
any consideration paid for the right to distribute the content
a brief statement of agreement with all terms listed above The Publisher receives this agreement, and signs it using its private key. Thus, any party with access to the Joe's Online Emporium's public key could verify that Joe's signed the agreement, and that the agreement has not been changed since Joe's signed it. The Publisher transmits the signed Distribution Agreement to the Authority, Ethical Inc.

Ethical Inc. now combines the signed TIA certificate and the Distribution Agreement into a single message, and signs the entire message using its private key. Ethical has now created a Publisher Identification message to go in its own stega-cipher channel into the content. Ethical Inc. now generates new stega-cipher masks and encodes this message into a copy of the content using a stega-cipher encoder. The Authority saves the masks as a Receipt in a database, along with information on the details of the transfer, including the title, artist and publisher.

Ethical then transfers this watermarked copy to the Joe's Online Emporium, the Publisher. Well known encryption methods could be used to protect the transfer between the Authority and the Publisher. The Authority may now destroy its copy, which the Publisher has received. The Publisher, Joe's Online Emporium now assumes responsibility for any copies made to its version of the content, which is a Publisher Master copy.

Finally, the Consumer, John Q. Public wishes to purchase a copy of the content from Joe's Online Emporium. Joe's Emporium sends the John Q. Public a short agreement via an electronic communication link, similar to Publisher's Distribution Agreement, only this is a Purchase Agreement, which lists the content title
consumer identification
the terms of distribution
the consideration pas for the content
a brief statement of agreement with the terms above John Q. Public signs this agreement with his private key and returns it to the Joe's Online Emporium. The Publisher, Joe's prepares to encode its own stega-cipher watermark onto a copy of the content by generating a set of masks for the algorithm. Joe's Online Emporium then stores these masks (a receipt) in its own database, indexed by title and consumer. Joe's Online Emporium signs the agreement received from John Q. Public with the Emporium's own private key, and forwards it to the Authority, Ethical Inc., along with a copy of the masks. It is important to note that this communication should be done over a secured channel. The Authority verifies the Publisher and Consumer information and adds it own signature to the end of the message, approving the transaction, creating a Contract of Sale. The Authority adds the Publisher's receipt (mask set) to its database, indexed by the title, the publisher, and the consumer identification. The Authority signs the Contract of Sale by encrypting it with their private key. So anyone with the Authority's public key (any Publisher) could decrypt the Contract of Sale and verify it, once it was extracted from the content. The Publisher then transmits the signed Contract of Sale back to the Publisher, who uses a stega-cipher device to imprint this Contract as its own watermark over the content. The Publisher then transmits the newly watermarked copy to the Consumer, who is accepting responsibility for it. The Publisher destroys their version of the consumer's copy.

If this procedure is followed for all content distribution within such an online system then it should be possible for the Authority to identify the owner of a piece of content which appears to be unauthorized. The Authority could simply try its database of stega-cipher keys to decode the watermark in the content in question. For instance, if a copy of Seal's latest single originally distributed with stega-cipher watermarks showed up on an Internet ftp site the Authority should be able to extract a TIA Certificate and Distribution Agreement or a Contract of Sale identifying the responsible party. If a Publisher sold this particular copy to a Consumer, that particular publisher should be able to extract a Contract of Sale, which places responsibility with the Consumer. This is not a time critical application, so even if it takes days or weeks, it is still worthwhile.

In a modification to the protocol discussed above, each Publisher might act as its own Authority. However, in the context of online services, this could open avenues of fraud committed by the collusion of certain Publishers and Consumers. Using an Authority, or one of several available Authorities to keep records of Publisher-Consumer transactions and verify their details decreases the likelihood of such events.

It should also be obvious that a similar watermarking system could be used by an individual entity to watermark its own content for its own purposes, whether online or in physical media. For instance, a CD manufacturer could incorporate unique stega-cipher watermarks into specific batches of its compact discs to identify the source of a pirate ring, or to identify unauthorized digital copies made from its discs. This is possible because the stega-cipher encoding works with the existing formats of digital samples and does not add any new structures to the sample data that cannot be handled on electronic or mechanical systems which predate the stega-cipher.

VI. Increasing Confidence in the Stega-Cipher

The addition of a special pre-encoding process can make stega-cipher certificates even more secure and undeniable. Hash values may be incorporated which match exactly the content containing the watermark to the message in the watermark itself. This allows us a verification that the watermark decoded was encoded by whomever signed it into this precise location in this specific content.

Suppose one wants to use a 256 bit (32 byte) hash value which is calculated with a secure one-way hash function over each sample in each sample window that will contain the message. The hash starts with a seed value, and each sample that would be processed by the encoder when encoding the message is incorporated into the hash as it is processed. The result is a 256 bit number one can be highly confident is unique, or sufficiently rare to make intentionally duplicating it with another series of samples difficult.

It is important that the hash function be insensitive to any changes in the samples induced by the stega-cipher itself. For instance, one might ignore the least significant bit of each sample when computing the hash function, if the stega-cipher was implemented using a least significant bit encode mode.

Based on the size of the non-hash message, one knows the hash-inclusive message requires 32 more bytes of space. Once can now calculate the size of a signed encrypted copy of this message by signing and encrypting exactly as many random bytes as are in the message, and measuring the size of the output in bytes. One now knows the size of the message to be encoded. One can pre-process the sample stream as follows.

Proceed through stega-cipher encode loop as described in the claims. Instead of encoding, however, calculate hash values for each window series which will contain the message, as each sample is processed. At the end of each instance of "encoding" take the resultant hash value and use it to create a unique copy of the message which includes the hash value particular to the series of sample windows that will be used to encode the message. Sign and encrypt this copy of the message, and save it for encoding in the same place in the sample stream.

A memory efficient version of this scheme could keep on hand the un-hashed message, and as it creates each new copy, back up in the sample stream to the first window in the series and actually encode each message, disposing of its afterwards.

The important result is evident on decoding. The decoding party can calculate the same hash used to encode the message for themselves, but on the encoded samples. If the value calculated by the decoding party does not match the value contained in the signed message, the decoder is alerted to the fact that this watermark was transplanted from somewhere else. This is possible only with a hash function which ignores the changes made by the stega-cipher after the hash in the watermark was generated.

This scheme makes it impossible to transplant watermarks, even with the keys to the stega-cipher.

APPENDIX

Psuedo-code

```
const int WINDOW-- RESET = 256;
const int WINDOW-- SIZE = 128;
const int MARKER-- BITS = 1024;
const int CHUNK-- BITS = 2048 * 8;
int window-- offset;
int msg-- bit-- offset;
int frequency-- offset;
Boolean useCell;
/* 8 bits per bye, 1 byte per char */
unsigned char frequency-- mask[WINDOW-- SIZE/8];
unsigned char window-- mask[WINDOW-- RESET/8];
unsigned char msg-- start-- marker[MARKER-- BITS/8];
unsigned char msg-- end-- marker[MARKER-- BITS/8];
Int16 amplitude-- sample-- buffer[WINDOW-- SIZE];
float power-- frequency-- buffer[WINDOW-- SIZE];
unsigned char message-- buffer[CHUNK-- BITS/8];
void doFFT(Int16 *amp-- sample-- buffer, float *power--
   freq-- buffer,int size);
void doInverseFFT(Int16 *amp-- sample-- buffer, float
```

APPENDIX-continued

Psuedo-code

```
*power-- freq-- buffer,int size);
void initialize( );
Bit getBit(unsigned char *buffer,int bitOffset);
Boolean map(Bit window-- bit, Bit band-- bit, int window, int
frequency);
Boolean getSamples(Int16 *amplitude-- sample-- buffer,int
samples);
void encode( )
void initialize( )
{
/* message to be encoded is generated */
/* message is prefixed with 1024 bit msg-- start-- marker */
/* message is suffixed with 1024 bit msg-- end -- marker */
/* remaining space at end of message buffer padded with random bits */
window-- offset = 0;
msg-- bit-- offset = 0;
frequency-- offset = 0;
frequency-- mask loaded
window-- mask loaded
zeroAmpSampleBuffer( );
}
Boolean getSamples(Int16 *buffer,int samples)
{
/* get samples number of samples and shift them contiguously into the
sample
buffer from right to left*/
if(samples < samples available)
return false;
else
return true;
}
void doFFT(int16 *sample-- buffer, float *spectrum-- buffer,
int size)
{
calculate FFT on sample-- buffer, for size samples
store result in spectrum buffer
}
void doInverseFFT(Int16 *sample-- buffer,float *spectrum--
buffer,int size)
{
calculate inverse FFT on spectrum-- buffer
store result in sampe-- buffer
}
Bit getBit(unsigned char *buffer,in bitOffset)
{
returns value of specified bit in specified buffer
either 0 or 1, could use Boolean (true/false) values for bit set of bit
off
}
Boolean map(Bit window-- bit,Bit band-- bit,int window, int
frequency--
{
/* this is the function that makes the information difficult to find */
/* the inputs window-- bit and band-- bit depend only on the
mask values
used for encoding the information, they are 1) random, 2) secret */
/* window and frequency values are used add time and frequency band
dependent
complexity to this function */
/* this function is equivalent to a Boolean truth TABLE with window *
frequency * 4
possible input combinations and 2 possible output */
/* for any input combination, the output is either true or false */
/* window ranges from 0 to WINDOW-- RESET -1 */
/* frequency ranges from 0 to WINDOW-- SIZE - 1 */
return calculated truth value
}
void encodeBit(float *spectrum-- buffer,int freq-- offset,Bit
theBit)
{
/* modifies the value of the cell in spectrum-- buffer, indexed by
freq-- offset
in a manner that distinguishes each of the 2 possible values of
theBit,
1 or 0
*/
/* suggested method of setting the Least Significant bit of the cell ==
theBit */
/* alternative method of rounding the value of the cell upward or
downward to
certain fractional values proposed
i.e. <= .5 fractional remainder signifies 0, > .5 fraction remainder
signifies 1
*/
}
void encode( )
{
initialize( );
do {
if(getSamples(amplitude-- sample-- buffer) == false)
return
doFFT(amplitude-- sample-- buffer,power-- frequency--
buffer,WINDOW-- SIZE);
for (frequency-- offset = 0; frequency-- offset
< WINDOW-- SIZE;
frequency-- offset++){
useCell = map(getBit(window-- mask,window-- offset),
getBit(frequency-- mask,frequency-- offset),
window-- offset, frequency-- offset);
if(useCell == true){
encodeBit(power-- frequency-- buffer,frequency--
offset,
getBit(message-- buffer,msg-- bit-- offset));
message-- bit-- offset ++;
if(msg-- bit-- offset == MESSAGEBITS){
initialize( );
break; /* exit frequency loop */
}
}
}
doInverseFFT(amplitude-- sample-- buffer,power-- frequency
-- buffer,
WINDOW-- SIZE);
outputSamples(amplitude-- sample-- buffer);
window-- offset++;
if(window-- offset == WINDOW-- RESET){
window-- offset = 0;
}
} while(true);
}
```

The encode( ) procedure processes an input sample stream using the specified frequency and window masks as well as a pre-formatted message to encode.

encode( ) processes the sample stream in windows of WINDOW—SIZE samples, contiguously distributed in the sample stream, so it advances WINDOW—SIZE samples at a time.

For each sample window, encode( ) first compute the FFT of the window, yielding its Power Spectrum Estimation. For each of these windows PSEs, encode( ) then uses the map( ) function to determine where in each PSE to encode the bits of the message, which it reads from the message buffer, on ebit at a time. Each time map( ) returns true, encode( ) consumes another sample from the message.

After each window is encoded, encode( ) computes the inverse FFT on the PSE to generate a modified sample window, which is then output as the modified signal. It is important the sample windows NOT overlap in the sample stream, since this would potentially damage the preceeding encoding windows in the stream.

Once the message is entirely encoded, including its special end of message marker bit stream, encode( ) resets it internal variables to being encoding the message once more in the next window, encode( ) proceeds in this manner until the input sample stream is exhausted.

```
enum {
Synchronizing,
Locked
}; /* decode states */
unsigned char message-- end-- buffer[MARKER-- BITS];
Bit decodeBit(float *spectrum-- buffer,int freq-- offset)
/* reads the value of the cell in spectrum-- buffer, indexed by
freq-- offset
in a manner that distinguishes each of the 2 possible values of an
encoded bit, 1 or 0
*/
/* suggested method of testing the Least Significant bit of the cell */
/* alternative method of checking the value of the cell versus certain
fractional
remainders proposed.
i.e. <= .5 fractional remainder signifies 0, > .5 fraction remainder
signifies 1
*/
return either 1 or 0 as appropriate
}
Boolean decode( )
{
/* Initialization */
state = Synchronizing
window-- offset = 0;
set frequency mask
set window mask
clear sample buffer
int nextSamples = 1;
int msg-- start-- offset = 0;
clear message-- end-- buffer
Bit aBit;
Boolean bitsEqual;
do {
if(state == Synchronizing){
nextSamples = 1;
window-- offset = 0;
}
else
nextSamples = WINDOW-- SIZE;
if(getSamples(amplitude-- sample-- buffer) == false)
return false;
doFFT(amplitude-- sample-- buffer,power-- frequency-
- buffer,
WINDOW-- SIZE);/* 2 */
for (frequency-- offset = 0; frequency-- offset
< WINDOW-- SIZE;
frequency-- offset++){
useCell = map(getBit(window-- mask,window-- offset),
getBit(frequency-- mask,frequency-- offset),
window-- offset, frequency-- offset);
if(useCell == true){
aBit = decodeBit(power-- frequency-- buffer,
frequency-- offset);
setBit(message-- buffer,message-- bit-- offset,aBit);
message-- bit-- offset ++;
}
else
continue;
if(state == Synchronizing){
bitsEqual =
compareBits(message-- start-- marker,message--
buffer,
message-- bit-- offset);
if(!bitsEqual){
message-- bit-- offset = 0;
misaligned = true;
break; /* exit frequency loop */
}
else if (message-- bit-- offset == MARKER-- BITS)
state == Locked;
}
else {
/* locked onto encoded stream */
shift aBit into right side of message-- end-- buffer
bitsEqual = compareBits(message-- end-- buffer,
msg-- end-- marker,MARKER-- BITS);
if(bitsEqual)
return true;
}
}
}
} while (true);
}
```

The decode( ) procedure scans an input sample stream using specified window and frequency masks, until it either decodes a valid message block, storing it in a message buffer, or exhausts the sample stream.

The decode( ) procedure starts in state Synchronizing, in which it does not know where in the sample stream the encoding windows are aligned. The procedure advances the sample window through the sample stream one sample at a time, performing the FFT calculation on each window, and attempting to decode valid message bits from the window. As it extracts each bit using the map( ) function, the decode( ) procedure compares these bits against the start of message marker. As soon as a mismatch is detected, the decode( ) procedure knows it is not yet properly aligned to an encoding window, and immediately ceases decoding bits from the current window and moves to the next window, offset by 1 sample. The decode( ) procedure continues in this manner until it matches successfully the complete bitstream of a start of message marker. At this point the decode( ) procedure assumes it is aligned to an encoded message and can then decode bits to the message buffer quickly, advancing the sample window fully at each iterations. It is now in Locked mode. For each bit it stores in the message buffer when in Locked mode, the decode( ) procedure also shifts the same bit value into the least significant bit of the message—end—buffer. After each bit is decoded in Locked mode, the decode( ) procedure checks compares the message—end—buffer with the msg—end—marker in a bit by bit manner. When a complete match is found, decode( ) is finished and returns true. If the sample stream is exhausted before this occurs, decode( ) returns false. If decode( ) returns true, a valid message is stored in the message buffer, including the start and end of message markers.

REFERENCES

The following references may be of use to those lacking skill in the art of steganography or the various cryptographic techniques discussed in this document Press, Flannery, Teukolsky, and Vetterling, Numerical Recipies in C, Cambridge University Press, 1988
  12. Fourier Transform Spectral Methods, pgs. 398-470
Ken C. Pohlman, Principles of Digital Audio, 2nd ed., SAMS, 1991
B. Schneier, Applied Cryptography, John Wiley & Sons, Inc. New York 1994 particularly the following sections for steganography:
  4.1 Subliminal Channel, pgs. 66-68
  16.6 Subliminal Channel, pgs. 387-392
  particularly the following sections for cryptography and digital signatures
  Chapter 2: Protocol Building Blocks, pgs 28-41
D. Kahn, The Code Breakers, The Macmillan Company, 1969
  particularly the following sections on steganography
  pgs xiii, 513, 515
U.S. Pat. No. 4,908,873 Philibert et al.
U.S. Pat. No. 5,412,718 Narasimhalu, et al.
U.S. Pat. No. 4,979,210 Nagata et al.
U.S. Pat. No. 5,073,925 Nagata et al.

U.S. Pat. No. 5,287,407 Holmes
U.S. Pat. No. 4,980,782 Ginkel
U.S. Pat. No. 5,408,505 Indeck, et al.
U.S. Pat. No. 5,365,586 Indeck, et al.
U.S. Pat. No. 4,200,770 Hellman, Diffie
U.S. Pat. No. 4,218,582 M. E. Hellman and R. C Merkle
U.S. Pat. No. 4,405,829 Rivest, Shamir, Adelman
U.S. Pat. No. 4,748,668 Shamir, Fiat

The invention claimed is:

1. A device comprising:
    a processor coupled to a memory;
    said processor and said memory configured to execute a steganographic cipher process to watermark content, by receiving content and additional information, and watermarking said content
    according to at least one mapping between said received content and said additional information using a steganographic cipher process.

2. The device of claim 1, wherein the steganographic cipher process utilizes a key to watermark the content.

3. The device of claim 1, wherein the steganographic cipher process utilizes a key to locate and extract at least one watermark.

4. The device of claim 1, wherein the steganographic cipher process watermarks the content based on frequency, time or bit-depth characteristics of the content.

5. The device of claim 1, wherein the steganographic cipher process starts at an arbitrary point in the content.

6. The device of claim 1, wherein the steganographic cipher process watermarks content imperceptibly.

7. An article of manufacture comprising a non-transitory machine-readable medium having stored thereon content encoded with additional information wherein the additional information comprising instructions steganographically encoded using a key, which instructions, when executed by a processor, result in a process comprising:
    receiving a key to be used to steganographically decode additional information; and
    using the received key to steganographically decode the additional information from the encoded content
    wherein the key comprises at least one of a plurality of mappings between the additional information and the encoded content.

8. The article of manufacture of claim 7, wherein the additional information is encoded at one or more locations in the content.

9. The article of manufacture of claim 7, wherein the additional information is located to enable detection or decoding of the watermark.

10. The article of manufacture of claim 7, wherein the additional information is encoded at one or more locations in features of the content.

11. The article of manufacture of claim 7, wherein the additional information is encoded at the granularity of the content.

12. The article of manufacture of claim 7, wherein the additional information is integral with the perceptibility of the content.

13. The article of manufacture of claim 7, wherein the content was encoded by a watermarking process, an information hiding process, a steganographic process, or a steganographic cipher process.

14. An article of manufacture comprising a non-transitory machine-readable medium having stored thereon instructions adapted to be executed by a processor, the instructions which, when executed, result in a process comprising:
    selecting a portion of the watermarked signal to decode additional information including a watermark; and
    decoding the additional information in the signal according to at least one mapping between the encoded additional information and the watermarked signal such that information associated with the contents of the watermark is limited by the article of manufacture.

15. The article of manufacture of claim 14, wherein the watermark is hashed, encrypted or signed.

16. The article of manufacture of claim 14, wherein the watermark is resistant to tampering.

17. The article of manufacture of claim 14, wherein the watermark cannot be transplanted.

18. The article of manufacture of claim 14, wherein the watermark is unique to the signal.

19. The article of manufacture of claim 14, wherein the step of decoding limits information associated with the encoding.

20. An article of manufacture comprising a non-transitory machine-readable medium, having thereon stored instructions adapted to be executed by a processor, which instructions when executed result in a process comprising:
    identifying locations in a signal encoded with additional information; and
    extracting the additional information from the signal using a key wherein the key comprises at least one of a plurality of mappings between the additional information and the encoded signal.

21. An apparatus comprising:
    a processor coupled to a memory;
    a receiver for receiving content encoded with at least one digital watermark; and
    a decoder for decoding the at least one digital watermark by locating and extracting the at least one digital watermark using a steganographic cipher and at least one key derived from the encoding process wherein the key comprises at least one mapping between the at least one digital watermark and the encoded content.

22. The apparatus according to claim 21, wherein said apparatus includes a second processor configured for processing keys.

23. The apparatus according to claim 21, wherein said apparatus includes a second processor configured for processing cryptographic information.

24. The apparatus according to claim 21, wherein said first and said second processors are the same processor.

25. An article of manufacture comprising a non-transitory machine-readable medium, having thereon stored instructions adapted to be executed by a processor, which instructions when executed result in a process comprising:
    identifying watermarking locations within the digital signal;
    receiving additional information including a watermark; and
    embedding the additional information including a watermark into the identified locations in the digital signal using a key wherein the key comprises at least one mapping between the additional information and the digital signal being embedded.

26. The article of manufacture of claim 25, wherein keys are used for the identifying or embedding step or both the identifying and embedding steps.

27. The article of manufacture of claim 25, wherein said keys are capable of determining the size of the additional information measured in bits.

28. The article of manufacture of claim 25, further comprising embedding the additional information by a random or pseudo random process.

29. The article of manufacture of claim 25, further comprising embedding the additional information to differentiate between two machine-readable mediums containing copies of the same embedded digital signal.

30. A computer-implemented process for decoding additional information from a watermarked signal comprising:
   selecting, in a machine, a portion of the watermarked signal to decode additional information including a watermark; and
   decoding, with the machine, the additional information in the signal according to at least one mapping between the encoded additional information and the watermarked signal such that information associated with the contents of the watermark is limited by the article of manufacture.

31. The process of claim 30, wherein the watermark is hashed, encrypted or signed.

32. The process of claim 30, wherein the watermark is resistant to tampering.

33. The process of claim 30, wherein the watermark cannot be transplanted.

34. The process of claim 30, wherein the watermark is unique to the signal.

35. The process of claim 30, wherein the step of decoding limits information associated with the encoding.

36. A computer-implemented process for extracting additional information from a steganographically encoded signal comprising:
   identifying, in a machine, locations in a signal encoded with additional information; and
   extracting, with the machine, the additional information from the signal using a key from a database wherein the key comprises at least one of a plurality of mappings between the additional information and the encoded signal.

37. The computer-implemented process of claim 36, wherein the additional information is encoded at one or more locations in the signal.

38. The computer-implemented process of claim 36, wherein the additional information is located to enable detection or decoding of a watermark.

39. The computer-implemented process of claim 36, wherein the additional information is encoded at one or more locations in features of the signal.

40. The computer-implemented process of claim 36, wherein the additional information is encoded at the granularity of the signal.

41. The computer-implemented process of claim 36, wherein the additional information is integral with the perceptibility of the signal.

42. The computer-implemented process of claim 36, wherein the signal was encoded by a watermarking process, an information hiding process, a steganographic process, or a steganographic cipher process.

43. A computer-implemented process for decoding at least one digital watermark from content comprising:
   receiving, in a machine, content encoded with at least one digital watermark; and
   decoding, with the machine, the at least one digital watermark by locating and extracting the at least one digital watermark using a steganographic cipher and at least one key derived from the encoding process wherein the key determines at least one mapping of the at least one digital watermark.

44. The computer-implemented process of claim 43, wherein the digital watermark is encoded at one or more locations in the content.

45. The computer-implemented process of claim 43, wherein the digital watermark is located to enable detection or decoding of the watermark.

46. The computer-implemented process of claim 43, wherein the digital watermark is encoded at one or more locations in features of the content.

47. The computer-implemented process of claim 43, wherein the digital watermark is encoded at the granularity of the content.

48. The computer-implemented process of claim 43, wherein the digital watermark is integral with the perceptibility of the content.

49. The computer-implemented process of claim 43, wherein the content was encoded by a watermarking process, an information hiding process, a steganographic process, or a steganographic cipher process.

50. A computer-implemented process to decode additional information from steganographically encoded data using a key comprising:
   receiving, in a machine, data steganographically encoded with additional information;
   receiving, at said machine, a key from a database to steganographically decode additional information; and
   using, at said machine, the received key to steganographically decode the additional information from the received steganographically encoded data wherein the key determines at least one mapping of the additional information.

51. The computer-implemented process of claim 50, wherein the additional information is encoded at one or more locations in the data.

52. The computer-implemented process of claim 50, wherein the additional information is located to enable detection or decoding of a watermark.

53. The computer-implemented process of claim 50, wherein the additional information is encoded at one or more locations in features of the data.

54. The computer-implemented process of claim 50, wherein the additional information is encoded at the granularity of the data.

55. The computer-implemented process of claim 50, wherein the additional information is integral with the perceptibility of the data.

56. The computer-implemented process of claim 50, wherein the data was encoded by a watermarking process, an information hiding process, a steganographic process, or a steganographic cipher process.

57. A computer-implemented process for embedding additional information into a digital signal comprising:
   identifying, in a machine, watermarking locations within the digital signal;
   receiving, at said machine, additional information including a watermark; and
   embedding, at said machine, the additional information including a watermark into the identified locations in the digital signal using a key from a memory wherein the key comprises at least one mapping between the additional information and the digital signal being embedded.

58. The process of claim 57, wherein keys are used for the identifying or embedding step or both the identifying and embedding steps.

59. The process of claim 57, wherein said keys are capable of determining the size of the additional information measured in bits.

60. The process of claim 57, further comprising embedding the additional information by a random or pseudo random process.

61. The process of claim 57, further comprising embedding the additional information to differentiate between two machine-readable mediums containing copies of the same embedded digital signal.

* * * * *

UNITED STATES PATENT AND TRADEMARK OFFICE
CERTIFICATE OF CORRECTION

| | | |
|---|---|---|
| PATENT NO. | : 7,870,393 B2 | Page 1 of 1 |
| APPLICATION NO. | : 11/894443 | |
| DATED | : January 11, 2011 | |
| INVENTOR(S) | : Moskowitz | |

It is certified that error appears in the above-identified patent and that said Letters Patent is hereby corrected as shown below:

In the Cover Page, paragraph (60) reading:
"(60) Continuation of application No. 08/999,766, filed on Jul. 23, 1997, which is a division of application No. 08/775,216, filed on Dec. 31, 1996, now Pat. No. 5,687,236, which is a division of application No. 08/489,172, filed on Jun. 7, 1995, now Pat. No. 5,613,004."

should read:

"(60) Continuation of application No. 08/999,766, filed on Jul. 23, 1997, now Pat. No. 7,568,100, which is a division of application No. 08/775,216, filed on Dec. 31, 1996, now Pat. No. 5,687,236, which is a continuation of application No. 08/489,172, filed on Jun. 7, 1995, now Pat. No. 5,613,004."

Signed and Sealed this
Twenty-ninth Day of March, 2011

David J. Kappos
*Director of the United States Patent and Trademark Office*

UNITED STATES PATENT AND TRADEMARK OFFICE
CERTIFICATE OF CORRECTION

PATENT NO.         : 7,870,393 B2                                    Page 1 of 1
APPLICATION NO.    : 11/894443
DATED              : January 11, 2011
INVENTOR(S)        : Moskowitz It is certified that error appears in the above-identified patent and that said Letters Patent is hereby corrected as shown below:

Column 1, Line 6

"This application is a continuation of pending U.S. patent application Ser. No. 08/999,766, filed Jul. 23, 1997, which is a division of U.S. patent application Ser. No. 08/775,216, filed Dec. 31, 1996, now U.S. Pat. No. 5,687,236 (which is a division of U.S. patent application Ser. No. 08/489,172, filed Jun. 7, 1995 (now U.S. Pat. No. 5,613,004)). The previously identified patents and/or patent applications are hereby incorporated by reference, in their entireties."

should read:

"This application is a continuation of U.S. patent application Ser. No. 08/999,766, filed Jul. 23, 1997, now U.S. Pat. No. 7,568,100, which is a division of U.S. patent application Ser. No. 08/775,216, filed Dec. 31, 1996, now U.S. Pat. No. 5,687,236, which is a continuation of U.S. patent application Ser. No. 08/489,172, filed Jun. 7, 1995, now U.S. Pat. No. 5,613,004. The previously identified patents and/or patent applications are hereby incorporated by reference, in their entireties."

Signed and Sealed this
Twelfth Day of July, 2011

David J. Kappos
*Director of the United States Patent and Trademark Office*

UNITED STATES PATENT AND TRADEMARK OFFICE
CERTIFICATE OF CORRECTION

PATENT NO.       : 7,870,393 B2
APPLICATION NO.  : 11/894443
DATED            : January 11, 2011
INVENTOR(S)      : Moskowitz It is certified that error appears in the above-identified patent and that said Letters Patent is hereby corrected as shown below:

Replace column 16 line 48 through column 20 line 7 with the following:

APPENDIX

Pseudo-code

```
const int WINDOW_RESET = 256;
const int WINDOW_SIZE = 128;
const int MARKER_BITS = 1024;
const int CHUNK_BITS = 2048 * 8;
int window_offset;
int msg_bit_offset;
int frequency_offset;
Boolean useCell;
/* 8 bits per bye, 1 byte per char */
unsigned char frequency_mask[WINDOW_SIZE/8];
unsigned char window_mask[WINDOW_RESET/8];
unsigned char msg_start_marker[MARKER_BITS/8];
unsigned char msg_end_marker[MARKER_BITS/8];
Int16 amplitude_sample_buffer[WINDOW_SIZE];
float power_frequency_buffer[WINDOW_SIZE];
unsigned char message_buffer[CHUNK_BITS/8];
void doFFT(Int16 *amp_sample_buffer, float *power_freq_buffer,int size);
void doInverseFFT(Int16 *amp_sample_buffer, float *power_freq_buffer,int size);
void initialize( );
```

Signed and Sealed this
Twentieth Day of December, 2011

David J. Kappos
*Director of the United States Patent and Trademark Office*

```
Bit getBit(unsigned char *buffer,int bitOffset);
Boolean map(Bit window_bit, Bit band_bit, int window, int frequency);
Boolean getSamples(Int16 *amplitude_sample_buffer,int samples);
void encode( )
void initialize( )
{
    /* message to be encoded is generated */
    /* message is prefixed with 1024 bit msg_start_marker */
    /* message is suffixed with 1024 bit msg_end_marker */
    /* remaining space at end of message buffer padded with random
       bits */
    window_offset = 0;
    msg_bit_offset = 0;
    frequency_offset = 0;
    frequency_mask loaded
    window_mask loaded
    zeroAmpSampleBuffer( );
}
Boolean getSamples(Int16 *buffer,int samples)
{
    /* get samples number of samples and shift them contiguously
       into the sample buffer from right to left*/
    if(samples < samples available)
        return false;
    else
        return true;
}
void doFFT(Int16 *sample_buffer, float *spectrum_buffer, int size)
{
    calculate FFT on sample_buffer, for size samples
    store result in spectrum buffer
}
```

```
void doInverseFFT(Int16 *sample_buffer,float *spectrum_buffer,int size)
{
    calculate inverse FFT on spectrum_buffer
    store result in sample_buffer
}
Bit getBit(unsigned char *buffer,in bitOffset)
{
    returns value of specified bit in specified buffer
    either 0 or 1, could use Boolean (true/false) values for bit set of
    bit off
}
Boolean map(Bit window_bit,Bit band_bit,int window, int frequency_
{
    /* this is the function that makes the information difficult to find */
    /* the inputs window_bit and band_bit depend only on the mask
        values used for encoding the information, they are 1) random, 2)
        secret */
    /* window and frequency values are used add time and frequency
        band dependent complexity to this function */
    /* this function is equivalent to a Boolean truth table with window *
        frequency * 4 possible input combinations and 2
        possible output */
    /* for any input combination, the output is either true or false */
    /* window ranges from 0 to WINDOW_RESET -1 */
    /* frequency ranges from 0 to WINDOW_SIZE - 1 */
    return calculated truth value
}
void encodeBit(float *spectrum_buffer,int freq_offset,Bit theBit)
{
    /* modifies the value of the cell in spectrum_buffer, indexed by
        freq_offset in a manner that distinguishes each of the 2 possible
```

```
                values of theBit, 1 or 0
        */
        /* suggested method of setting the Least Significant bit of the
                cell = = theBit */
        /* alternative method of rounding the value of the cell upward or
                downward to certain fractional values proposed
                    i.e. <= .5 fractional remainder signifies 0, > .5 fraction
                        remainder signifies 1
        */
}
void encode( )
{
        initialize( );
        do {
        if(getSamples(amplitude_sample_buffer) = = false)
            return
        doFFT(amplitude_sample_buffer,power_frequency_buffer,
        WINDOW_SIZE);
        for (frequency_offset = 0; frequency_offset < WINDOW_SIZE;
        frequency_offset++){
                useCell = map(getBit(window_mask,window_offset),
                        getBit(frequency_mask,frequency_offset),
                    window_offset, frequency_offset);
                if(useCell = = true){
                    encodeBit(power_frequency_buffer,frequency_offset,
                    getBit(message_buffer,msg_bit_offset));
                message_bit_offset ++;
                if(msg_bit_offset = = MESSAGEBITS){
                    initialize( );
                    break; /* exit frequency loop */
```

```
        }
      }
    }
    doInverseFFT(amplitude_sample_buffer,power_frequency_buffer,
        WINDOW_SIZE);
    outputSamples(amplitude_sample_buffer);
    window_offset++;
    if(window_offset = = WINDOW_RESET){
        window_offset = 0;
    }
    } while(true);
}
```

---

The encode( ) procedure processes an input sample stream using the specified frequency and window masks as well as a pre-formatted message to encode.

encode( ) processes the sample stream in windows of WINDOW_SIZE samples, contiguously distributed in the sample stream, so it advances WINDOW_SIZE samples at a time.

For each sample window, encode( ) first compute the FFT of the window, yielding its Power Spectrum Estimation. For each of these window PSEs, encode( ) then uses the map( ) function to determine where in each PSE to encode the bits of the message, which it reads from the message buffer, one bit at a time. Each time map( ) returns true, encode( ) consumes another sample from the message.

After each window is encoded, encode( ) computes the inverse FFT on the PSE to generate a modified sample window, which is then output as the modified signal. It is important the sample windows NOT overlap in the sample stream, since this would potentially damage the preceeding encoding windows in the stream.

Once the message is entirely encoded, including its special end of message marker bit stream, encode( ) resets it internal variables to begin encoding the message once more in the next window, encode( ) proceeds in this manner until the input sample stream is exhausted.

CERTIFICATE OF CORRECTION (continued)
U.S. Pat. No. 7,870,393 B2

```
enum {
    Synchronizing,
    Locked
}; /* decode states */
unsigned char message_end_buffer[MARKER_BITS];
Bit decodeBit(float *spectrum_buffer,int freq_offset)
{
    /* reads the value of the cell in spectrum_buffer, indexed by
        freq_offset in a manner that distinguishes each of the 2
        possible values of an encoded bit, 1 or 0
    */
    /* suggested method of testing the Least Significant bit of the cell */
    /* alternative method of checking the value of the cell versus certain
        fractional remainders proposed.
        i.e. <= .5 fractional remainder signifies 0, > .5 fraction
            remainder signifies 1
    */
    return either 1 or 0 as appropriate
}
Boolean decode( )
{
    /* Initialization */
    state = Synchronizing
    window_offset = 0;
    set frequency mask
    set window mask
    clear sample buffer
    int nextSamples = 1;
    int msg_start_offset = 0;
    clear message_end_buffer
    Bit aBit;
```

```
Boolean bitsEqual;
do {
    if(state = = Synchronizing){
        nextSamples = 1;
        window_offset = 0;
    }
    else
        nextSamples = WINDOW_SIZE;
    if(getSamples(amplitude_sample_buffer) = = false)
        return false;
    doFFT(amplitude_sample_buffer,power_frequency_buffer,
    WINDOW_SIZE);/* 2 */
for (frequency_offset = 0; frequency_offset < WINDOW_SIZE;
frequency_offset++){
    useCell = map(getBit(window_mask,window_offset),
        getBit(frequency_mask,frequency_offset),
        window_offset, frequency_offset);
    if(useCell = = true){
        aBit = decodeBit(power_frequency_buffer,
            frequency_offset);
        setBit(message_buffer,message_bit_offset,aBit);
        message_bit_offset ++;
    }
    else
        continue;
    if(state = = Synchronizing){
        bitsEqual =
        compareBits(message_start_marker,message_buffer,
            message_bit_offset);
        if(!bitsEqual){
            message_bit_offset = 0;
            misaligned = true;
            break; /* exit frequency loop */
```

```
            }
            else if (message_bit_offset = = MARKER_BITS)
                    state = = Locked;
            }
            else {
                /* locked onto encoded stream */
                shift aBit into right side of message_end_buffer
                bitsEqual = compareBits(message_end_buffer,
                    msg_end_marker,MARKER_BITS);
                if(bitsEqual)
                    return true;
            }
        }
    } while (true);
}
```